(12) United States Patent
Nakamura et al.

(10) Patent No.: US 7,832,229 B2
(45) Date of Patent: Nov. 16, 2010

(54) INTEGRATED UNIT FOR REFRIGERANT CYCLE DEVICE

(75) Inventors: Tomohiko Nakamura, Obu (JP); Thuya Aung, Kariya (JP)

(73) Assignee: Denso Corporation, Kariya (JP)

( * ) Notice: Subject to any disclaimer, the term of this patent is extended or adjusted under 35 U.S.C. 154(b) by 488 days.

(21) Appl. No.: 12/070,307

(22) Filed: Feb. 18, 2008

(65) Prior Publication Data
US 2008/0196446 A1    Aug. 21, 2008

(30) Foreign Application Priority Data
Feb. 19, 2007    (JP) .............................. 2007-037667

(51) Int. Cl.
    *F25B 1/00*    (2006.01)
(52) U.S. Cl. .......................... 62/498; 62/500
(58) Field of Classification Search .................. 62/498, 62/170, 191, 198, 199, 200, 513, 515; 471/77, 471/151, 168; 165/908
    See application file for complete search history.

(56) References Cited

U.S. PATENT DOCUMENTS

| 7,178,359 | B2 | 2/2007 | Oshitani et al. | |
| 7,654,108 | B2 * | 2/2010 | Ishizaka et al. | 62/500 |
| 2005/0268644 | A1 | 12/2005 | Oshitani et al. | |
| 2007/0169510 | A1 * | 7/2007 | Ishizaka et al. | 62/500 |
| 2007/0169511 | A1 * | 7/2007 | Ishizaka et al. | 62/500 |
| 2007/0169512 | A1 * | 7/2007 | Ishizaka et al. | 62/515 |

FOREIGN PATENT DOCUMENTS

| JP | 2000-111208 | 4/2000 |
| JP | 2003-118350 | 4/2003 |
| JP | 2003-118358 | 4/2003 |
| JP | 2005-308384 | 11/2005 |
| JP | 2006-200844 | 8/2006 |
| JP | 2007-192504 | 8/2007 |
| WO | WO 2006/109617 | 10/2006 |

OTHER PUBLICATIONS

U.S. Appl. No. 11/659,620, filed Feb. 7, 2007, Ishizaka et al.
Office action dated Jan. 20, 2009 in Japanese Application No. 2007-037667.
Office action dated Sep. 8, 2008 in Japanese Application No. 2007-037667.

* cited by examiner

*Primary Examiner*—Mohammad M Ali
(74) *Attorney, Agent, or Firm*—Harness, Dickey & Pierce, PLC

(57) ABSTRACT

In an integrated unit for a refrigerant cycle device, at least one evaporator is integrated with an ejector having a nozzle portion for decompressing refrigerant and a refrigerant suction port from which refrigerant is drawn. In the integrated unit, an insertion hole is provided in a longitudinal end surface of a tank of the evaporator such that the ejector is inserted from the insertion hole into the tank, and a plug for sealing the insertion hole is provided. Furthermore, a spacer is configured to have a gap between the plug and the ejector, and a fixing member is disposed between the longitudinal end surface of the tank and an expansion valve, for fixing the expansion valve to the longitudinal end surface of the tank. In the integrated unit, at least one of the fixing member, the plug, and the spacer is made of a resin material.

19 Claims, 16 Drawing Sheets

( θ = 0° )

( θ = 45° )

( θ = 180° )

| | θ (°) | NOISE REDUCE (dB) |
|---|---|---|
| FIRST EMBODIMENT | 45 | 4 |
| FIRST EMBODIMENT | 180 | 4 |
| MODIFICATION OF FIRST EMBODIMENT | 45 | 5 |
| MODIFICATION OF FIRST EMBODIMENT | 180 | 5 |
| COMPARATIVE EXAMPLE | 45 | 3 |

INTEGRATED UNIT FOR REFRIGERANT CYCLE DEVICE

CROSS REFERENCE TO RELATED APPLICATION

This application is based on Japanese Patent Application No. 2007-037667 filed on Feb. 19, 2007, the contents of which are incorporated herein by reference in its entirety.

FIELD OF THE INVENTION

The present invention relates to an integrated unit including at least an evaporator and an ejector. The integrated unit can be suitably used for a refrigerant cycle device.

BACKGROUND OF THE INVENTION

Conventionally, a refrigerant cycle device is known which includes an ejector serving as refrigerant decompression means and refrigerant circulation means. The refrigerant cycle device having the ejector is effectively used, for example, for an air conditioner for a vehicle, a refrigeration device for freezing and refrigerating goods mounted on a vehicle, or the like. Further, the refrigerant cycle device is also effectively used as a stationary refrigerant cycle system, for example, an air conditioner, a refrigerator, a freezer, and the like.

JP-A-2005-308384 (corresponding to U.S. Pat. No. 7,178,359) proposes such a refrigerant cycle device. In this document, an ejector is arranged outside of an evaporator, and formed integrally with the evaporator. Thus, the ejector and the evaporator can be handled as one integrated unit, thereby improving the mounting property of the refrigerant cycle device on a vehicle. However, the above-described related art needs a space for arranging the ejector outside the evaporator.

SUMMARY OF THE INVENTION

US 2007/0169511A1 (corresponding to JP 2007-192504A) proposes an integrated unit 20 for a refrigerant cycle device in which an ejector 14 is disposed in a header tank 18b for collection of refrigerant in an evaporator 18, as shown in FIG. 21. FIG. 21 shows a comparative example in which elements having functions similar to those of embodiments, which are described later, are indicated by the same reference numbers, for comparison. In the integrated unit 20, the ejector 14 is disposed in the header tank 18b of the evaporator 18, so as to reduce the space for mounting the ejector 14 and the evaporator 18.

Specifically, in the comparative example shown in FIG. 21, a connection block 23 for forming a refrigerant inlet 25 and a refrigerant outlet 26 is disposed on the side end of the header tank 18b in the longitudinal direction. An ejector-insertion hole 63 14 is provided in the connection block 23, and the ejector 14 is inserted from the hole 63 into the header tank 18b.

An interposing plate 64 is interposed between the connection block 23 and the side end of the header tank 18b in the longitudinal direction. In the interposing plate 64, a cylindrical portion 64d protruding into the header tank 18b in a cylindrical shape is formed concentrically with the ejector-insertion hole 63. A flange 64e bent radially inward in a ring shape is integrally formed at the tip of the protrusion of the cylindrical portion 64d.

An annular portion 74 protruding radially outward in an annular shape is formed on the outer peripheral surface of the ejector 14. The annular portion 74 is engaged with the flange 64e of the interposing plate 64 to define the position of insertion of the ejector 14.

After inserting the ejector 14 into the header tank 18b, a spacer 100 is inserted into the ejector-insertion hole 63, so that a male thread of a plug 101 is screwed with a female thread of the ejector-insertion hole 63.

Thus, the plug 101 pushes an annular main body 100a of the spacer 100 toward the ejector 14, so that the tip of a protruding piece 100b which protrudes from a part of the main body 100a of the spacer 100 is abutted against the side surface of the ejector 14 on the side of the nozzle portion 14a thereby to fix the ejector 14 in the longitudinal direction.

In the comparative example of FIG. 21, the connection block 23 is made of aluminum material, and integrally brazed to the side end of the header tank 18b in the longitudinal direction. Furthermore, a thermal expansion valve 13 for decompressing the refrigerant flowing into the integrated unit 20 is connected to the connection block 23 by a screw.

The inventors of the present application have found from the detailed studies that the following problems may be caused in the comparative example of FIG. 21. That is, the thermal expansion valve 13 is adapted to decompress the refrigerant by drastically restricting a refrigerant flow through a throttle passage as is known in the art. Furthermore, a temperature sensing portion 13a is displaced according to the temperature of the refrigerant, and a valve stem and a valve body are displaced in cooperating with the displacement of the temperature sensing portion 13a so as to adjust the degree of opening (valve opening degree) of the throttle passage.

However, when the refrigerant flow is drastically restricted in this way, disturbance occurs in the refrigerant flow decompressed to cause the refrigerant flow to vibrate. The vibration of the refrigerant flow vibrates the thermal expansion valve 13 itself. Further, the valve stem and the valve body vibrate following the fluctuations in instant pressure of the refrigerant together with a change in opening degree of the valve. Thus, the vibration of the valve stem and the valve body causes the vibration of the thermal expansion valve 13 itself.

In the comparative example of FIG. 21, since the thermal expansion valve 13 is connected to the connection block 23 made of aluminum material by a screw, the vibration of the thermal expansion valve 13 tends to be transferred in a route from the connection block 23, to the plug 101, the spacer 100, and the ejector 14 in that order, allowing the ejector 14 to resonate easily.

It also has found that since the ejector 14 is disposed in the header tank 18b of the evaporator 18, the resonance of the ejector 14 is transferred to the entire evaporator 18, which may cause radiated sound (abnormal sounds) from the evaporator 18.

The ejector 14 serves as the refrigerant decompression means, and thus vibrates itself due to the disturbance of the refrigerant flow in decompressing the refrigerant. The vibration generated from the ejector 14 itself may also cause the occurrence of the radiated sound (abnormal sounds) from the evaporator 18.

In particular, when the integrated unit 20 is applied to the air conditioner for a vehicle, the integrated unit 20 is generally disposed inside an instrument panel at the front part of a passenger compartment of a vehicle. The radiated sound (abnormal sounds) generated from the evaporator 18 may lead to a big problem as noise in the passenger compartment.

In view of the foregoing problems, it is an object of the present invention to provide an integrated unit including an ejector disposed in a header tank of an evaporator, which can effectively reduce radiated sound from the evaporator.

According to a first aspect of the present invention, an integrated unit for a refrigerant cycle device includes an ejector and an evaporator which are being integrally assembled. The ejector has a nozzle portion for decompressing refrigerant, and a refrigerant suction port from which refrigerant is drawn by a refrigerant flow injected from the nozzle portion. Furthermore, the ejector is configured for mixing the refrigerant injected from the nozzle portion and the refrigerant drawn from the refrigerant suction port and for discharging the mixed refrigerant therefrom. The evaporator is for evaporating the refrigerant to be drawn into the refrigerant suction port or the refrigerant discharged from the ejector. Furthermore, the evaporator includes a plurality of tubes for allowing the refrigerant to flow therethrough, and a tank extending in a longitudinal direction that is substantially parallel to a direction of arrangement of the tubes. Here, the tank is configured to distribute the refrigerant into the tubes or collect the refrigerant flowing from the tubes. In the integrated unit, a plug is provided for sealing an insertion hole, and the insertion hole is provided in a longitudinal end surface of the tank such that the ejector is inserted from the insertion hole to be located in the tank. Furthermore, a spacer is configured to have a gap between the plug and the ejector, and a fixing member is disposed between the longitudinal end surface of the tank and an expansion valve for decompressing the refrigerant, for fixing the expansion valve to the longitudinal end surface of the tank. In addition, at least one of the fixing member, the plug, and the spacer is formed of a resin material. As an example, the resin material may be polybutylene terephthalate.

In the above structure of the integrated unit, the fixing member is positioned between the longitudinal end surface of the tank and the expansion valve so as to be located at a midway point of a route for transmitting vibration from the expansion valve to the plug and the spacer. Since at least one of the fixing member, the plug, and the spacer is made of the resin material, the resin material can be located at the midway point of the vibration transmitting route from the expansion valve to the fixing member, the plug, the spacer, and then the ejector in this order.

The vibration attenuation effect of the resin material can attenuate the vibration transmitted from the expansion valve to the ejector via the vibration transmitting route, thereby suppressing the transmission of the vibration of the expansion valve to the ejector. As a result, it can reduce the radiated sound (abnormal sounds) generated in the evaporator due to the transmission of vibration of the ejector to the entire evaporator.

Specifically, the use of polybutylene terephthalate as the resin material can exhibit the effect of attenuating the vibration, and also can ensure the mechanical strength required for the fixing member.

According to a second aspect of the present invention, an integrated unit for a refrigerant cycle device includes an ejector and an evaporator which are integrally assembled. The integrated unit further includes: a plug for sealing an insertion hole that is provided in a longitudinal end surface of a tank of the evaporator such that the ejector is inserted from the insertion hole to be located in the tank; a spacer configured to have a gap between the plug and the ejector; and a fixing member disposed between the longitudinal end surface of the tank and an expansion valve for decompressing the refrigerant, for fixing the expansion valve to the longitudinal end surface of the tank. In the integrated unit, a total weight of the fixing member, the plug, and the spacer is set to 20 g or more.

The total weight of the fixing member, the plug, and the spacer is set to 20 g or more, thereby it allows the fixing member, the plug, and the spacer to have the vibration attenuating effect. This can suppress the transmission of the vibration of the expansion valve to the ejector via the fixing member, the plug, and the spacer. For example, the plug, the spacer, and the fixing member can be integrally formed.

According to a third aspect of the present invention, an integrated unit for a refrigerant cycle device includes an ejector and an evaporator which are integrally assembled. The integrated unit further includes an insertion hole that is provided in a longitudinal end surface of a tank of the evaporator such that the ejector is inserted from the insertion hole to be located in the tank, and a fixing member disposed between the longitudinal end surface of the tank and an expansion valve for decompressing the refrigerant, for fixing the expansion valve to the longitudinal end surface of the tank. In addition, the fixing member is configured such that a direction of fixing the expansion valve to the fixing member is approximately perpendicular to a direction of insertion of the ejector into the tank. As an example, a mounting surface of the expansion valve to the fixing member may be configured to be in parallel to the direction of insertion of the ejector.

Because the direction of fixing the expansion valve to the fixing member is orthogonal to the direction of insertion of the ejector into the tank, the ejector can be avoided from being opposed to the direction of transmission of the vibration of the expansion valve. This can suppress the transmission of vibration of the expansion valve to the ejector.

As used herein, "the direction of fixing the expansion valve to the fixing member is orthogonal to the direction of insertion of the ejector into the tank" not only means that an angle between the fixing direction of the expansion valve to the fixing member and the insertion direction of the ejector into the tank is strictly 90°, but also implies that the angle between these directions is an angle slightly deviating from 90°.

According to a fourth aspect of the present invention, an integrated unit for a refrigerant cycle device includes an ejector and an evaporator which are integrally assembled. The integrated unit further includes: an expansion valve for decompressing refrigerant and fixed to a longitudinal end surface of a tank of the evaporator; a plug for sealing an insertion hole that is provided in the longitudinal end surface of the tank such that the ejector is inserted from the insertion hole to be located in the tank; a spacer configured to have a gap between the plug and the ejector; an ejector fixing mechanism, disposed in the tank, for fixing the ejector to the tank; and a buffer member disposed at least one of between the ejector fixing mechanism and the ejector, and between the spacer and the ejector.

For example, the buffer member may be disposed between the ejector fixing mechanism and the ejector thereby to be capable of suppressing the transmission of the vibration of the ejector to the ejector fixing mechanism, and further suppressing the transmission of the vibration of the ejector to the entire evaporator.

Another buffer member may be disposed between the spacer and the ejector thereby to be capable of suppressing the transmission of the vibration of the expansion valve to the ejector via the spacer, thus suppressing the transmission of the vibration of the ejector to the entire evaporator.

That is, the buffer member can be disposed at least one of between the ejector fixing mechanism and the ejector and between the spacer and the ejector, thereby enabling reduction of radiated sound from the evaporator. Here, the buffer member may be made of a resin material or a rubber material.

According to a fifth aspect of the present invention, an integrated unit for a refrigerant cycle device includes an ejector and an evaporator which are integrally assembled. The integrated unit further includes: a plug for sealing an insertion hole that is provided in a longitudinal end surface of a tank of the evaporator such that the ejector is inserted from the insertion hole to be located in the tank. In the integrated unit, the expansion valve for decompressing the refrigerant is fixed to the longitudinal end surface of the tank, the ejector is disposed in the tank such that an outlet side of the ejector for discharging the refrigerant therefrom, is directed in the insertion direction and such that an inlet side of the nozzle portion is directed opposite to the insertion direction, the ejector is adapted to be pushed in the insertion direction by a different in pressure between the outlet side and the inlet side of the ejector, and the plug and the ejector are located to have a space overall therebetween.

According to the fifth aspect of the present invention, because the space (void) is formed overall between the plug and the ejector, it can avoid the vibration of the expansion valve from being transmitted to the ejector via the plug.

According to a sixth aspect of the present invention, an integrated unit for a refrigerant cycle device includes an ejector and an evaporator which are integrally assembled. In the integrated unit, a longitudinal end surface of a tank of the evaporator is provided with an insertion hole such that the ejector is inserted from the insertion hole to be located in the tank, and the evaporator includes a heat-exchanging core portion having the tubes, in which the refrigerant flowing in the tubes is heat exchanged with air passing through the heat-exchanging core portion outside the tubes. In addition, a core surface of the heat-exchange core portion is inclined by 45° or more with respect to an upright set state in which the core surface of the heat-exchange core portion of the evaporator is in parallel to the direction of gravity, and the tank is positioned in an upper position in the direction of gravity with respect to the heat-exchange core portion.

Because the core surface is set so as to be inclined at an angle of 45° or more with respect to the upright set state, it is easy for the ejector to be immersed in the liquid-phase refrigerant, thus enables suppressing the vibration of the ejector. As a result, the radiated sound generated from the evaporator can be reduced.

As used herein, the phrase "a state in which the core surface is inclined by an angle of 45° or more with respect to the upright set state" includes a state in which the core surface is positioned horizontally, and a state in which the core surface is positioned upside down with respect to the upright set state, excluding a state in which the core surface is inclined by an angle below 45° with respect to the upright set state.

BRIEF DESCRIPTION OF THE DRAWINGS

Additional objects and advantages of the present invention will be more readily apparent from the following detailed description of preferred embodiments when taken together with the accompanying drawings. In which:

FIGS. 18A, 18B, and 18C are sectional views showing an evaporator tank in the integrated unit of the sixth embodiment, in which FIG. 18A shows a state with an inclination angle of 0°, FIG. 18B shows a state with an inclination angle of 45°, and FIG. 18C shows a state with an inclination angle of 180°;

DETAILED DESCRIPTION OF THE PREFERRED EMBODIMENTS

An integrated unit for a refrigerant cycle device and the refrigerant cycle device using the integrated unit according to embodiments of the invention will be described below. The integrated unit for the refrigerant cycle device is an integrated unit equipped with at least an evaporator and an ejector, for example.

The integrated unit for the refrigerant cycle device is connected to a condenser and a compressor, which are other components of the refrigerant cycle device, via pipes so as to construct the refrigerant cycle device including the ejector. The integrated unit for the refrigerant cycle device in one example can be applied to an indoor unit for cooling air. In another example, the integrated unit for the refrigerant cycle device can be used as an outdoor unit.

First Embodiment

Figure 1:
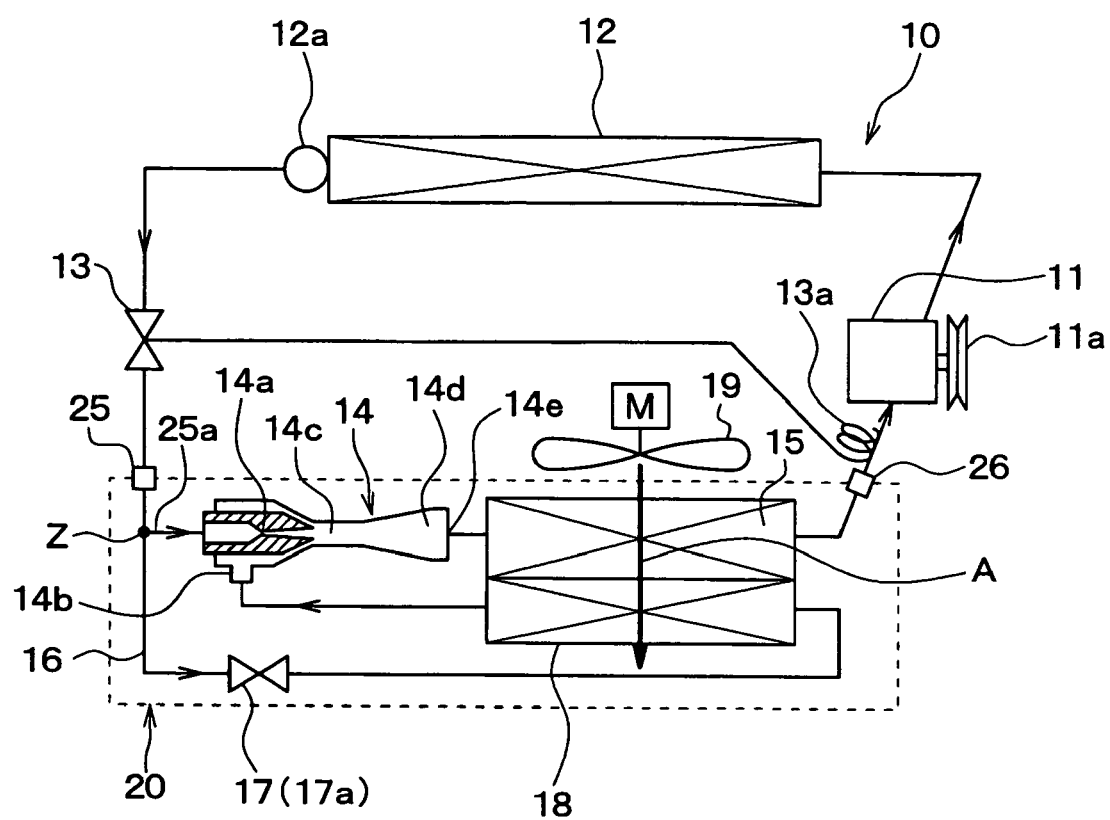
FIG. 1 is a schematic diagram showing a refrigerant cycle device according to a first embodiment of the invention.

A first embodiment of the present invention will be now described with reference to FIGS. 1 to 11. FIG. 1 shows an example in which a refrigerant cycle device 10 of the first embodiment is used for a refrigeration cycle for a vehicle. In the refrigerant cycle device 10 of this embodiment, a compressor 11 for sucking and compressing refrigerant is rotatably driven by an engine for vehicle running (not shown) via an electromagnetic clutch 11a, a belt, and the like.

As the compressor 11, may be used either a variable displacement compressor for being capable of adjusting a refrigerant discharge capacity by a change in discharge volume, or a fixed displacement compressor for adjusting a refrigerant discharge capacity by changing an operating efficiency of the compressor by intermittent connection of the electromagnetic clutch 11a. When an electric compressor is used as the compressor 11, the compressor 11 can adjust the refrigerant discharge capacity by adjustment of the number of revolutions of an electric motor.

A radiator 12 is disposed on the refrigerant discharge side of the compressor 11. The radiator 12 exchanges heat between high-pressure refrigerant discharged from the compressor 11 and outside air (air outside a vehicle compartment) blown by a cooling fan (not shown) to cool the high-pressure refrigerant.

In this embodiment, refrigerant whose high-pressure side pressure does not exceed the critical pressure, such as a flon-based or HC-based refrigerant, is used as the refrigerant for the refrigerant cycle device 10 to form a vapor-compression subcritical cycle. Thus, the radiator 12 serves as a condenser for cooling and condensing the refrigerant.

A liquid receiver 12a is provided on the outlet side of the radiator 12. The liquid receiver 12a has a vertically oriented tank shape to be well known, and serves as a gas-liquid separator for separating the refrigerant into gas and liquid phases to store the excess liquid refrigerant in the cycle. The liquid refrigerant is guided to flow from the lower part of the inside of the tank shape at the outlet of the liquid receiver 12a. The liquid receiver 12a is integrally formed with the radiator 12 in this embodiment.

The radiator 12 may have the known structure including a first heat exchange portion for condensation disposed on the upstream side of the refrigerant flow, the liquid receiver 12a for receiving the refrigerant introduced from the heat exchange portion for condensation to separate the refrigerant into gas and liquid phases, and a second heat exchange portion for supercooling of the saturated liquid refrigerant from the liquid receiver 12a.

A thermal expansion valve 13 is disposed on the outlet side of the liquid receiver 12a. The thermal expansion valve 13 serves as a decompression device for decompressing the liquid refrigerant from the liquid receiver 12a, and has a temperature sensing portion 13a disposed in a passage on the suction side of the compressor 11.

The thermal expansion valve 13 detects a degree of superheat of the refrigerant on the suction side of the compressor 11 based on the temperature and pressure of the suction side refrigerant of the compressor 11. Here, the suction side refrigerant of the compressor 11 corresponds to the refrigerant on the outlet side of an evaporator to be described later. The expansion valve 13 adjusts a degree of opening of a valve such that the degree of superheat of refrigerant on the compressor suction side is a preset predetermined value while a refrigerant flow amount can be adjusted, as being generally known.

An ejector 14 is disposed on the outlet side of the thermal expansion valve 13. The ejector 14 serves as a decompression means for decompressing the refrigerant, and also as a refrigerant circulation means (kinetic vacuum pump) for performing fluid transport so as to circulate the refrigerant by a suction action (an entrainment action) of a refrigerant flow ejected at high velocity.

The ejector 14 includes a nozzle portion 14a that decreases the passage sectional area of the refrigerant having passed through the thermal expansion valve 13 (intermediate-pressure refrigerant) to decompress and expand the refrigerant. The ejector 14 also includes a refrigerant suction port 14b that is arranged in the same space as a refrigerant ejection port of the nozzle portion 14a to draw the gas-phase refrigerant from a second evaporator 18 to be described later.

In the ejector 14, a mixing portion 14c is provided on a downstream side of the nozzle portion 14a and the refrigerant suction port 14b in a refrigerant flow, so as to mix the high-velocity refrigerant flow from the nozzle portion 14a with the suction refrigerant drawn into the refrigerant suction port 14b. Furthermore, a diffuser 14d serving as a pressure increasing portion is disposed on a downstream side of the refrigerant flow of the mixing portion 14c. The diffuser 14d is formed in such a shape to gradually increase the passage sectional area of the refrigerant, and has an effect of reducing the velocity of the refrigerant flow to increase the refrigerant pressure, that is, an effect of converting the velocity energy of the refrigerant to the pressure energy thereof.

A first evaporator 15 is connected to an outlet 14e of the ejector 14, which is positioned at the tip end of the diffuser 14d. Furthermore, a refrigerant outlet of the first evaporator 15 is connected to the suction side of the compressor 11.

In contrast, a refrigerant branch passage 16 branches from an inlet side of the ejector 14, at an intermediate part between the outlet side of the thermal expansion valve 13 and the inlet side of the ejector 14. The refrigerant branch passage 16 has a downstream side portion that is connected to the refrigerant suction port 14b of the ejector 14. A point z in FIG. 1 indicates a branch point of the refrigerant branch passage 16, branched from a refrigerant passage portion between the thermal expansion valve 13 and an inlet portion of the nozzle 14a of the ejector 14.

A throttle mechanism 17 is disposed in the refrigerant branch passage 16, and a second evaporator 18 is disposed on a downstream side from the throttle mechanism 17. The throttle mechanism 17 is a decompression means serving to exhibit an adjustment effect of the refrigerant flow amount into the second evaporator 18. Specifically, the throttle mechanism can be constructed of a capillary tube 17a. The second evaporator 18 can be used as an evaporator in an evaporator integrated unit, as an example.

In this embodiment, two evaporators 15 and 18 are assembled to an integrated structure with the following arrangement. The two evaporators 15 and 18 are accommodated in a case (not shown). A common electric blower 19 blows air (air to be cooled) through an air passage defined in the case in the direction of arrow "A". The blown air is cooled by the two evaporators 15 and 18.

The cold air cooled by the two evaporators 15, 18 is sent into a common space to be cooled (not shown). This leads to cooling of the common space to be cooled by the two evaporators 15, 18. Among these two evaporators 15 and 18, the first evaporator 15 connected to a main flow path on the downstream side of the ejector 14 is disposed on the upstream side (windward side) of the air flow A, and the second evaporator 18 connected to the refrigerant suction port 14b of the ejector 14 is disposed on the downstream side (leeward side) of the air flow A.

When the refrigerant cycle device 10 of this embodiment is used for vehicle air conditioning, the space inside the vehicle compartment is the space to be cooled. When the refrigerant cycle device 10 of this embodiment is applied to a freezer car, a freezer and refrigerator space of the freezer car is the space to be cooled. The space to be cooled can be suitably changed in accordance with the use of the refrigerant cycle device 10.

In this embodiment, the ejector 14, the first and second evaporators 15, 18, and the throttle mechanism 17 are assembled as one integrated unit 20.

Now, concrete examples of this integrated unit 20 will be described with reference to FIGS. 2 to 9.

Figure 2:
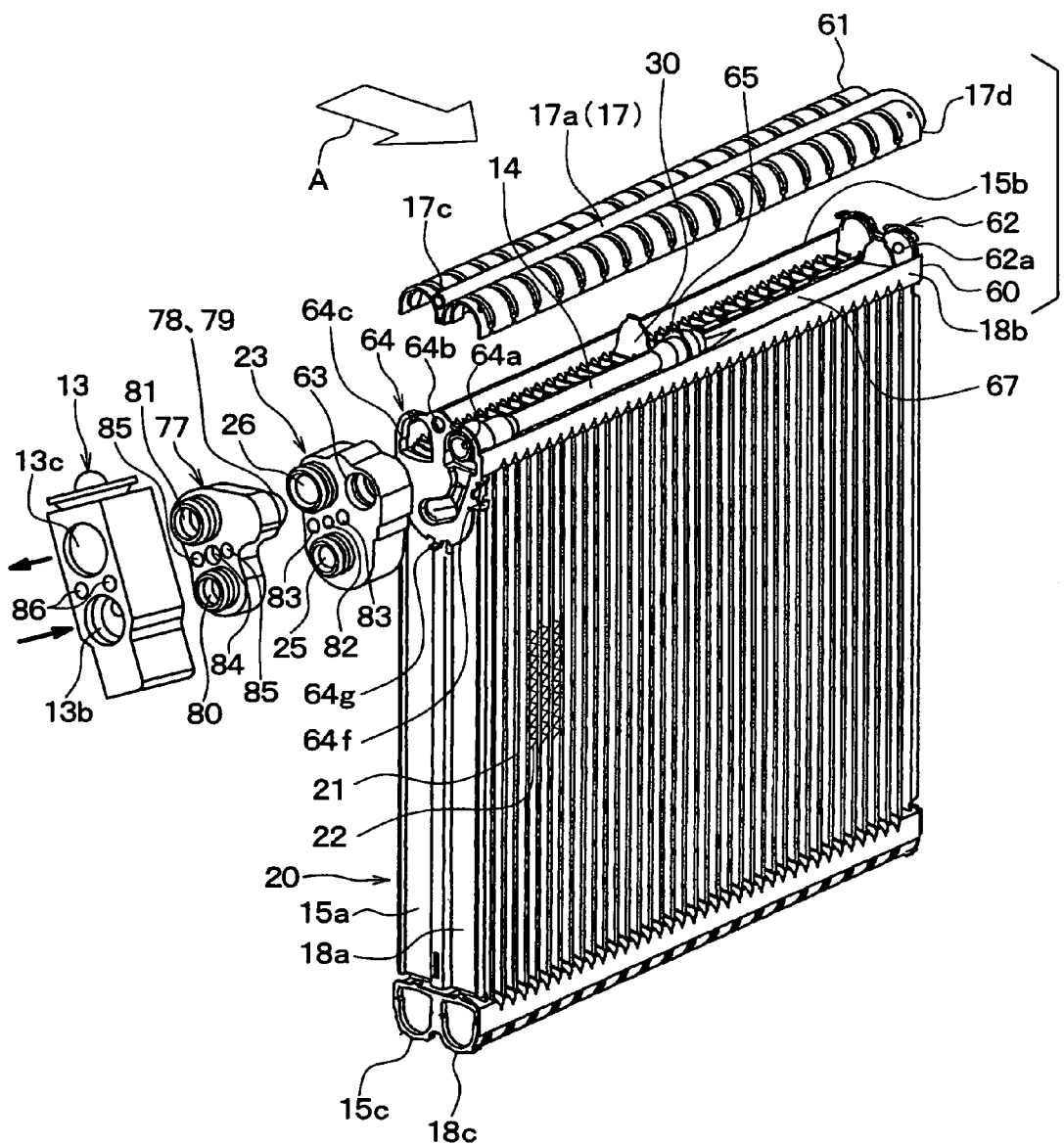
FIG. 2 is an exploded perspective view showing the schematic structure of an integrated unit in the first embodiment.
Figure 3:
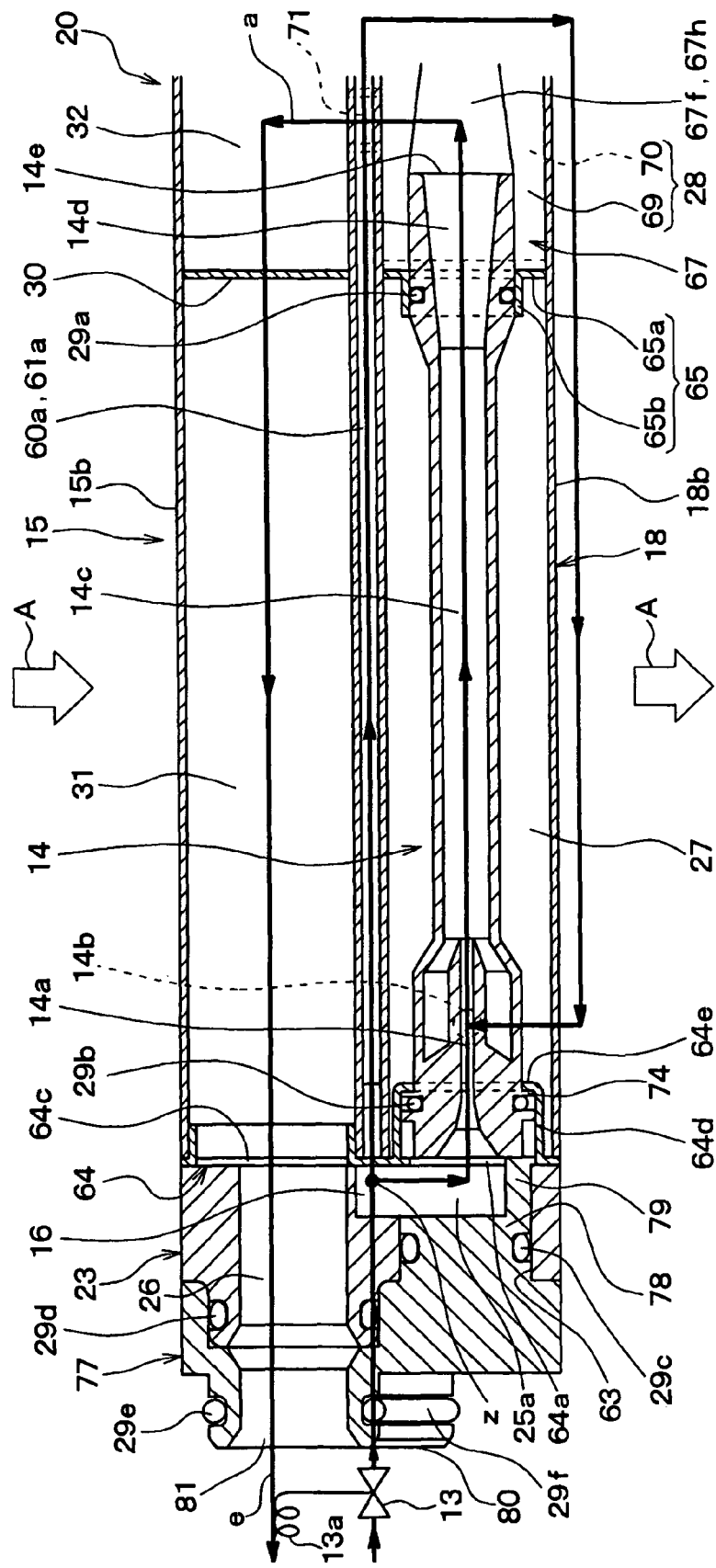
FIG. 3 is a schematic sectional view of an evaporator tank on a side of a connection block in the first embodiment.
Figure 4:
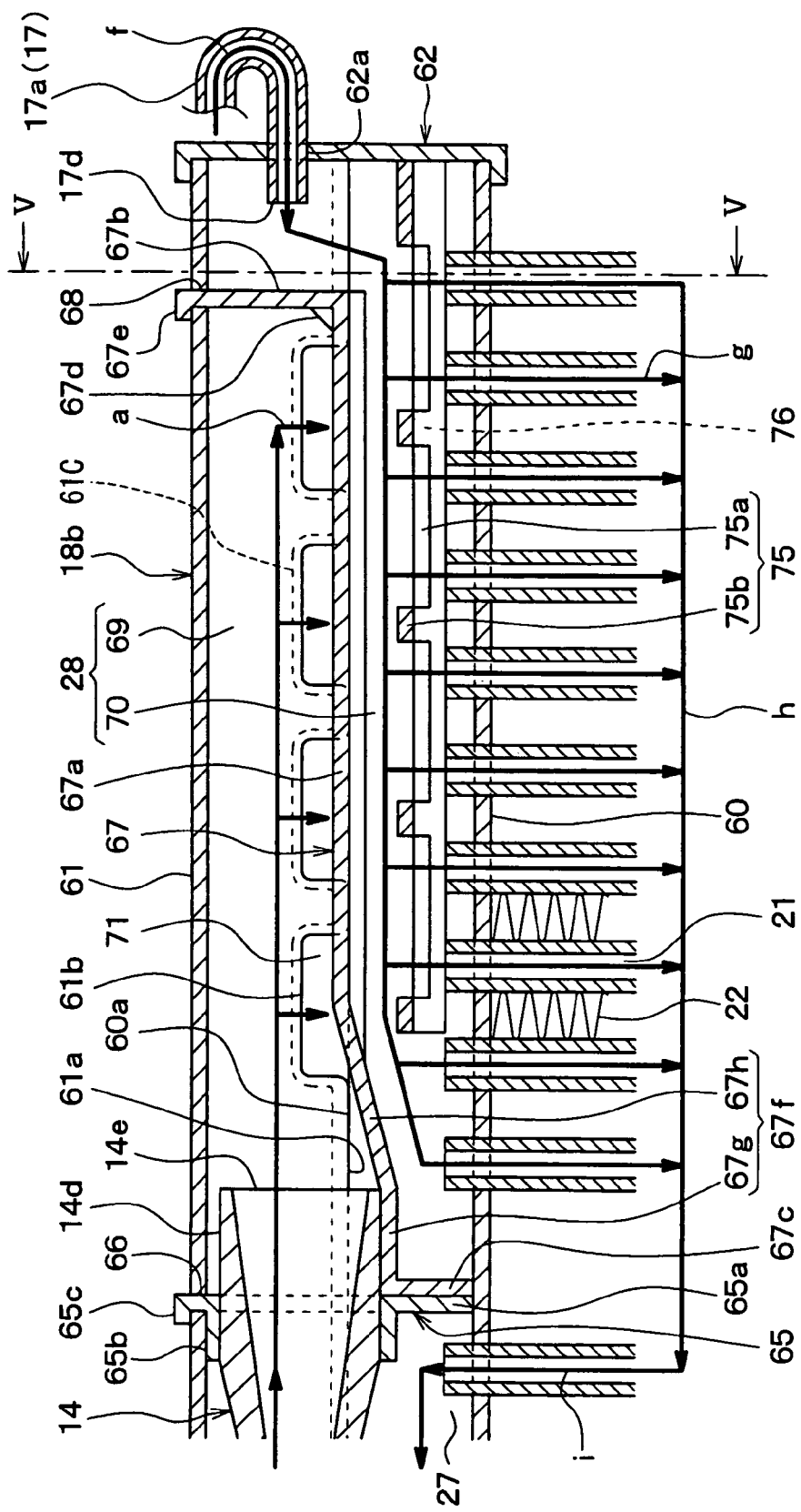
FIG. 4 is a schematic sectional view of the evaporator tank on the side opposite to the connection block in the first embodiment.
Figure 5:
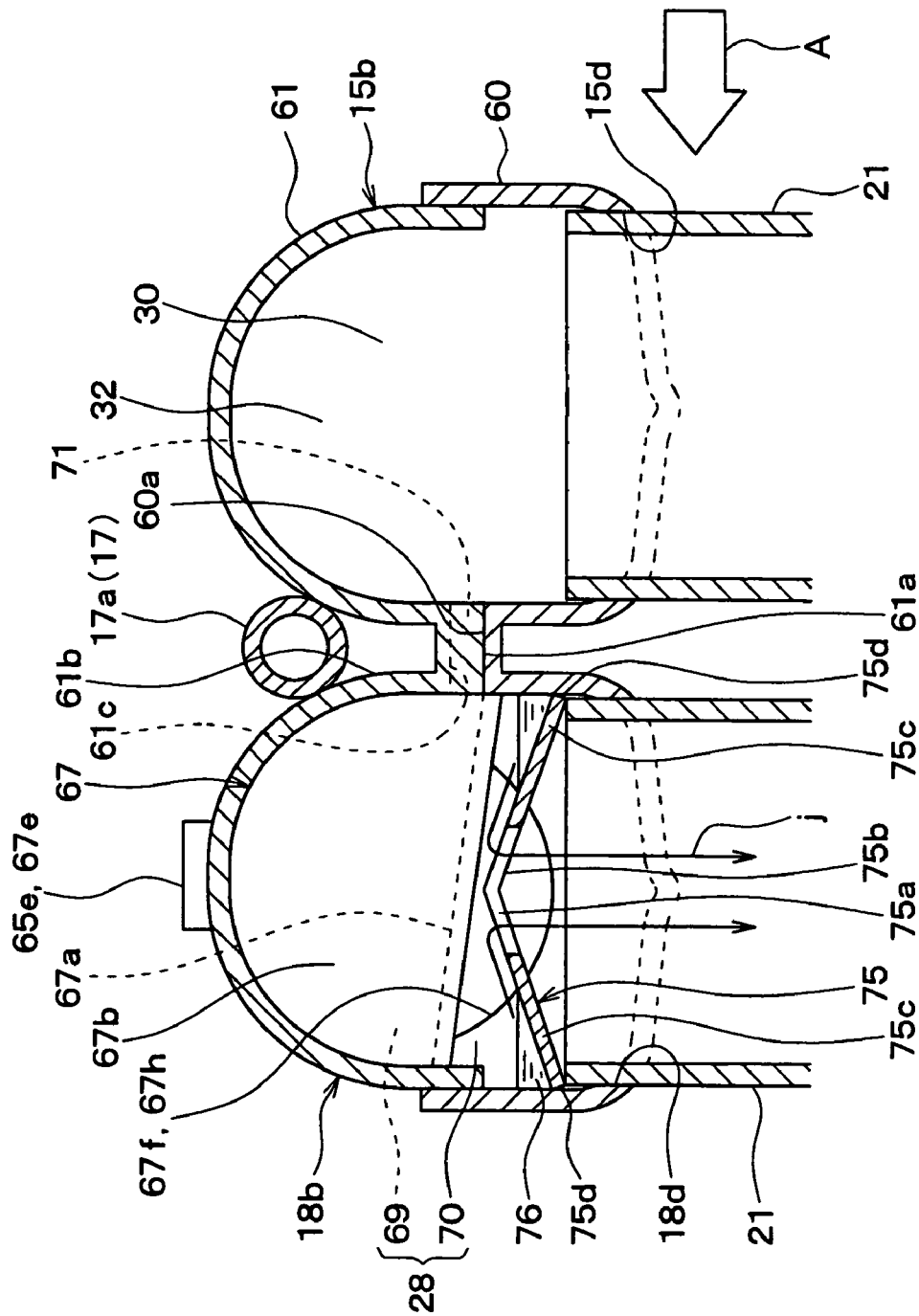
FIG. 5 is an enlarged sectional view taken along the line V-V in FIG. 4.

FIG. 2 is an exploded perspective view showing an outline of the entire structure of the first and second evaporators 15 and 18. FIG. 3 is a lateral sectional view of upper tanks of the first and second evaporators 15 and 18. FIG. 4 is a longitudinal sectional view of the upper tank of the second evaporator 18, and FIG. 5 is an enlarged sectional view taken along the line V-V in FIG. 4.

Now, an example of the integrated structure including the two evaporators 15 and 18 will be explained with reference to FIG. 2. In the example shown in FIG. 2, the two evaporators 15 and 18 are completely integrated as one evaporator structure. Thus, the first evaporator 15 constructs an upstream side portion of the air flow A in the integrated one evaporator structure, and the second evaporator 18 constructs a downstream side portion of the air flow A in the integrated one evaporator structure.

The first evaporator 15 and the second evaporator 18 have the same basic structure, including heat-exchange core portions 15a and 18a, and tanks 15b, 15c, 18b, and 18c positioned on both upper and lower sides of the heat-exchange core portions 15a and 18a.

Each of the heat-exchange core portions 15a and 18a include a plurality of tubes 21 respectively extending vertically. Between these tubes 21, a passage is formed for allowing a heat-exchanged medium, that is, the air to be cooled in this embodiment, to pass therethrough.

Fins 22 are disposed between adjacent these tubes 21 in a stack direction of the tubes 21, and can be brazed to the tubes 21. Each of the heat-exchange core portions 15a and 18a is constructed of a stacked structure including the tubes 21 and the fins 22. These tubes 21 and fins 22 are alternately staked in the stack direction (e.g., the left/right or lateral direction of the heat-exchange core portions 15a and 18a). In another example, a structure without fins 22 can be employed.

Although FIG. 2 shows only parts of the fins 22, the fins 22 may be formed over the entire areas of the heat-exchange core portions 15a and 18a. The stacked structure including the tubes 21 and the fins 22 is formed over each of the entire areas of the heat-exchange core portions 15a and 18a. The blown air from the electric blower 19 passes through voids of the stacked structure.

The tube 21 constructs a refrigerant passage, and is constructed of a flat tube having a flat section elongated along the air flow direction A. The fin 22 is a corrugated fin formed by bending a thin plate in a wave-like shape, and is connected to the flat outer surface of the tube 21 to increase an air-side heat transmission area.

The tube 21 of the heat-exchange core portion 15a and the tube 21 of the heat-exchange core portion 18a respectively construct the refrigerant passages that are independent from each other. The tanks 15b and 15c on both upper and lower sides of the first evaporator 15, and the tanks 18b and 18c on both upper and lower sides of the second evaporator 18 construct the refrigerant passage spaces that are independent from each other.

As shown in FIGS. 2 and 5, both the upper and lower ends of the tube 21 of the heat-exchange core portion 15a are inserted into the tanks 15b and 15c on both the upper and lower sides of the first evaporator 15. The tanks 15b and 15c have tube engagement holes 15d for connection. Both the upper and lower ends of the tube 21 are in communication with the inner spaces of the tanks 15b and 15c.

Similarly, both the upper and lower ends of the tube 21 of the heat-exchange core portion 18a are inserted into the tanks 18b and 18c on both the upper and lower sides of the second evaporator 18. The tanks 18b and 18c have tube engagement holes 18d for connection. Both the upper and lower ends of the tube 21 are in communication with the inner spaces of the tanks 18b and 18c.

Thus, the tanks 15b, 15c, 18b, and 18c on both the upper and lower sides serve to distribute the refrigerant into the respective tubes 21 of the heat-exchange core portions 15a and 18a, and to collect the refrigerant streams from the tubes 21.

FIG. 5 only shows the tube engagement holes on the upper tanks 15b and 18b, among the tube engagement holes 15d and 18d of the tube tanks 15b, 15c, 18b, and 18c on both the upper and lower end sides. Since the tube engagement holes on the side of the lower tanks 15c and 18c have the same structure as that of the tube engagement holes 15d and 18d on the upper tanks 15b and 18b side, illustration of the tube engagement holes on the lower tanks 15c and 18c side will be omitted.

The two upper tanks 15b and 18b as well as the two lower tanks 15c and 18c are adjacent to each other, and thus can be formed integrally. Alternatively, the two upper tanks 15b and 18b, and the two lower tanks 15c and 18c may be formed independently.

In the present embodiment, as shown in FIGS. 2 and 5, the two upper tanks 15b and 18b are formed to be divided into a tube side half-divided member 60, an opposite-tube side half-divided member 61, and a cap 62.

More specifically, the tube side half-divided member 60 has a substantially W-shaped section in which respective half-divided parts on the bottom sides of the two upper tanks 15b and 18b are integrally formed. The opposite-tube side half-divided member 61 has a substantially M-shaped section in which respective half-divided parts on the upper side of the two upper tanks 15b and 18b are integrally formed.

A flat portion 60a is formed in the center area of the substantially W-shaped section of the tube side half-divided member 60. Another flat portion 61a is formed in the center area of the substantially M-shaped section of the opposite-tube side half-divided member 61. The tube side half-divided member 60 and the opposite-tube side half-divided member 61 are combined with each other in a top-bottom direction to cause the flat portion 60a to be brought into tightly contact with the flat portion 61a, so as to form two cylindrical portions. Further, one ends of the two cylindrical portions in the longitudinal direction (right ends thereof shown in FIG. 2) are covered with a cap 62 to construct two upper tanks 15b and 18b.

Aluminum which is a metal having excellent thermal conductivity and brazing property is suitable as specific material for components of the evaporator 15, 18, such as the tube 21, the fin 22, and the tanks 15b, 15c, 18b and 18c. Each component is formed using the aluminum material, so that all components of the first and second evaporators 15 and 18 can be assembled and connected integrally by brazing.

In this embodiment, the connection block 23 shown in FIG. 2 and the capillary tube 17a or the like constituting the throttle mechanism 17 are integrally assembled to the first and second evaporators 15 and 18 by brazing.

On the other hand, since the ejector 14 has a fine passage formed in the nozzle portion 14a with high accuracy, when the ejector 14 is brazed, the nozzle portion 14a may be thermally deformed due to the high temperature in brazing (brazing temperature of aluminum: about 600 degrees). Unfortunately, this may not keep the shape and dimension of the passage in the nozzle portion 14a according to a predetermined design.

For this reason, after integrally brazing the first and second evaporators 15 and 18, the connection block 23 and the capillary tube 17a, the ejector 14 is assembled to the evaporator side.

More specifically, the assembly structure including the ejector 14, the capillary tube 17a, and the connection block 23 will be described below. The capillary tube 17a and the connection block 23 are formed of aluminum material, like the evaporator components.

As shown in FIG. 5, the capillary tube 17a is arranged to be inserted into a valley portion 61b formed above the flat portion 61a of the opposite-tube side half-divided member 61 of the upper tanks 15b and 18b.

The connection block 23 is a member brazed and fixed to one side (e.g., left side in FIG. 2) of each of the upper tanks 15b and 18b in the longitudinal direction in the first and second evaporators 15 and 18. The connection block 23 includes one refrigerant inlet 25 and one refrigerant outlet 26 of the integrated unit 20 shown in FIGS. 1 and 6, and an ejector-insertion hole 63 through which the ejector 14 is inserted into the upper tank 18b. The ejector-insertion hole 63 is a hole provided in the connection block 23, for inserting the ejector 14.

Figure 6:
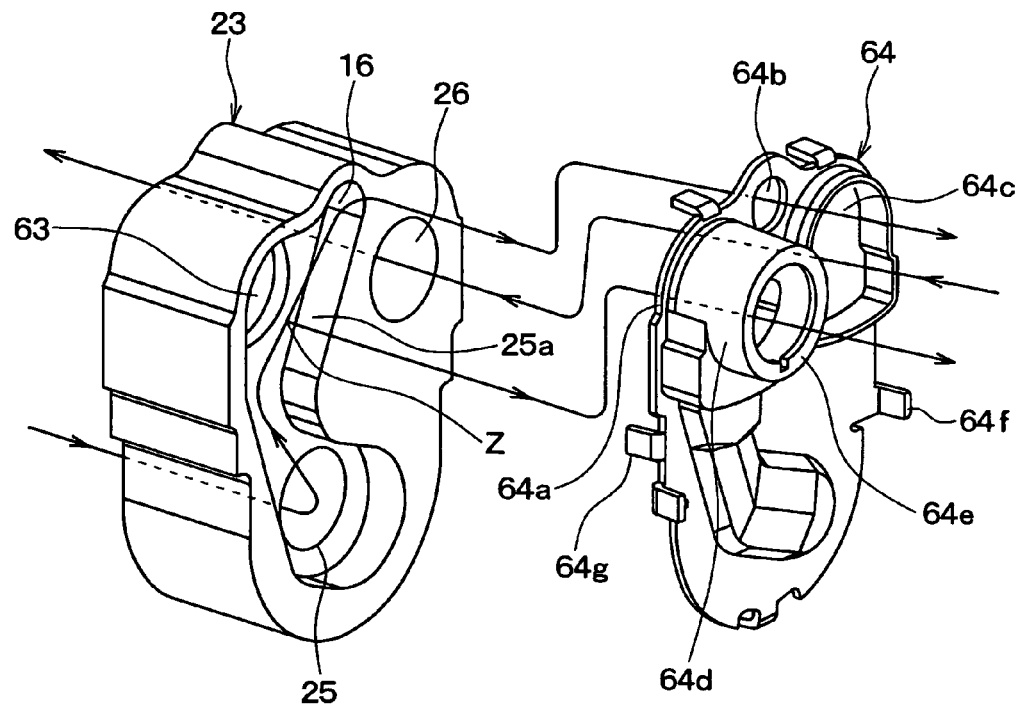
FIG. 6 is a schematic perspective view showing the connection block and an interposing plate of the integrated unit in the first embodiment.

As shown in FIGS. 3 and 6, the refrigerant inlet 25 is branched at the midway point of the connection block 23 in the thickness direction into a main passage 25a serving as a first passage directed toward an inlet of the ejector 14, and a branch passage 16 serving as a second passage directed toward an inlet of the capillary tube 17a. This branch passage 16 corresponds to an inlet portion of the branch passage 16 shown in FIG. 1. Thus, the branch point z shown in FIG. 1 is formed inside the connection block 23.

In contrast, the refrigerant outlet 26 is constructed of one simple passage hole (circular hole or the like) penetrating the connection block 23 in the thickness direction.

The connection block 23 is brazed and fixed to the sides of the upper tanks 15b and 18b via an interposing plate 64. The interposing plate 64 is integrally fixed to the connection block 23 to form the above-described main passage 25a and the branch passage 16, and to fix the ejector 14 in the longitudinal direction.

The interposing plate 64 made of aluminum material includes a main passage side opening 64a in communication with the main passage 25a of the connection block 23, a branch passage side opening 64b in communication with the branch passage 16 of the connection block 23, and a refrigerant outlet side opening 64c in communication with the refrigerant outlet 26 of the connection block 23.

A cylindrical portion 64d is formed at the peripheral edge of the main passage side opening 64a, and inserted into the upper tank 18b. An annular flange 64e is formed at the tip of the cylindrical portion 64d to protrude radially inwardly in the cylindrical portion 64d.

The inner diameter of the flange 64e is set slightly larger than the maximum outer diameter of the diffuser 14d at the tip portion of the ejector 14. The tip portion of the ejector 14 can be inserted into the upper tank 18b through the ejector-insertion hole 63 in the connection block 23 and through the inside of the cylindrical portion 64d of the interposing plate 64.

On the other hand, the ejector 14 has an annular portion 74 formed on the outer peripheral surface at the end on the inlet side (nozzle portion 14a side) of the ejector 14 in the longitudinal direction. The annular portion 74 protrudes in an annular shape radially outwardly. The annular portion 74 is engaged with the flange 64e of the interposing plate 64. That is, the engagement of the annular portion 74 with the flange 64e of the interposing plate 64 can define the position of insertion of the ejector 14.

First claw portions 64f protruding from the interposing plate 64 toward the evaporator side are caulked to the upper tanks 15b and 18b, so that the interposing plate 64 can be temporarily fixed to the evaporator side. Second claw portions 64g protruding from the interposing plate 64 toward the connection block 23 side are caulked to the connection block 23, so that the connection block 23 can be temporarily fixed to the evaporator side.

The branch passage side opening 64b of the interposing plate 64 is sealed and connected to the end on the upstream side of the capillary tube 17a (left end thereof shown in FIG. 2) by brazing.

Such an arrangement of the connection block 23 and the interposing plate 64 allows the connection block 23 and the interposing plate 64 to be brazed to the sides of the upper tanks 15b and 18b in the following state. The refrigerant outlet 26 of the connection block 23 is in communication with a left space 31 of the upper tank 15b via the refrigerant outlet side opening 64c of the interposing plate 64. The main passage 25a of the connection block 23 is in communication with a left space 27 of the upper tank 18b via the main passage side opening 64a of the interposing plate 64. The branch passage 16 of the connection block 23 is in communication with the upstream side end 17c of the capillary tube 17a via the branch passage side opening 64b of the interposing plate 64.

An ejector fixing plate 65 serves to fix the diffuser 14d of the ejector 14, and to partition the inner space of the upper tank 18b into the left space 27 and the right space 28. The left space 27 of the upper tank 18b serves as a collecting tank for collecting the refrigerant having passed through the tubes 21 of the second evaporator 18.

The ejector fixing plate 65 is disposed substantially in the center area of the inner space of the upper tank 18b of the second evaporator 18 in the longitudinal direction, and brazed to the inner wall surface of the upper tank 18b.

Figure 7:
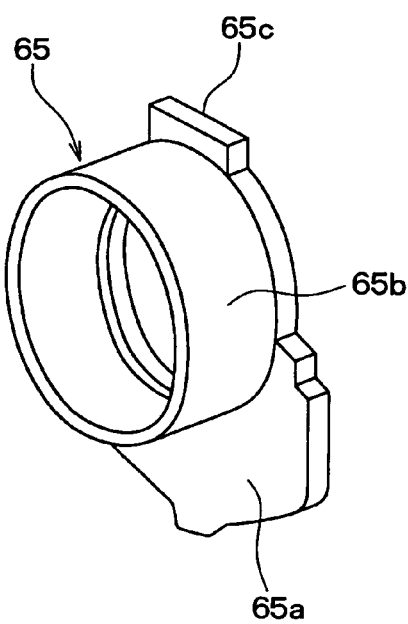
FIG. 7 is a schematic perspective view of an ejector fixing plate of the integrated unit in the first embodiment.

As shown in FIG. 7, the ejector fixing plate 65 includes a flat plate portion 65a directed in the longitudinal direction of the upper tank 18b (in the left/right direction shown in FIG. 7), a cylindrical portion 65b protruding from the flat plate portion 65a in the longitudinal direction of the upper tank 18b, and a claw portion 65c protruding upward from the upper end of the flat plate portion 65a. The ejector fixing plate 65 is made of aluminum material.

A through hole penetrating the ejector fixing plate 65 in the axial direction of the cylindrical portion 65b is formed in the inner space of the cylindrical portion 65b. The claw portion 65c penetrates a slit-like hole 66 on the upper surface of the upper tank 18b to be caulked to the upper tank 18b as shown in FIG. 4. This can temporarily fix the ejector fixing plate 65 to the upper tank 18b.

As shown in FIG. 4, the end 17d on the downstream side of the capillary tube 17a (right end) is inserted into the upper tank 18b in the direction of lamination of the tubes 21 (in the left/right direction shown in FIG. 4). More specifically, the end 17d on the downstream side of the capillary tube 17a is inserted into a through hole 62a of the cap 62 in the upper tank 18b to be opened in the upper space 28. A gap between the outer peripheral surface of the capillary tube 17a and the through hole 62a of the cap 62 is sealed and bonded by the brazing.

A partition plate 67 is disposed substantially in the vertical center of the upper space 28 of the upper tank 18b. The partition plate 67 is a member which serves to further partition the right space 28 into two spaces, that is, an upper space 69 and a lower space 70. The lower space 70 serves as a distribution tank for distributing the refrigerant among the tubes 21 of the second evaporator 18.

The partition plate 67 is an example of a partition plate in the invention. The upper space 69 is an example of a first space in the invention. The lower space 70 is an example of a second space in the invention.

Figure 8:
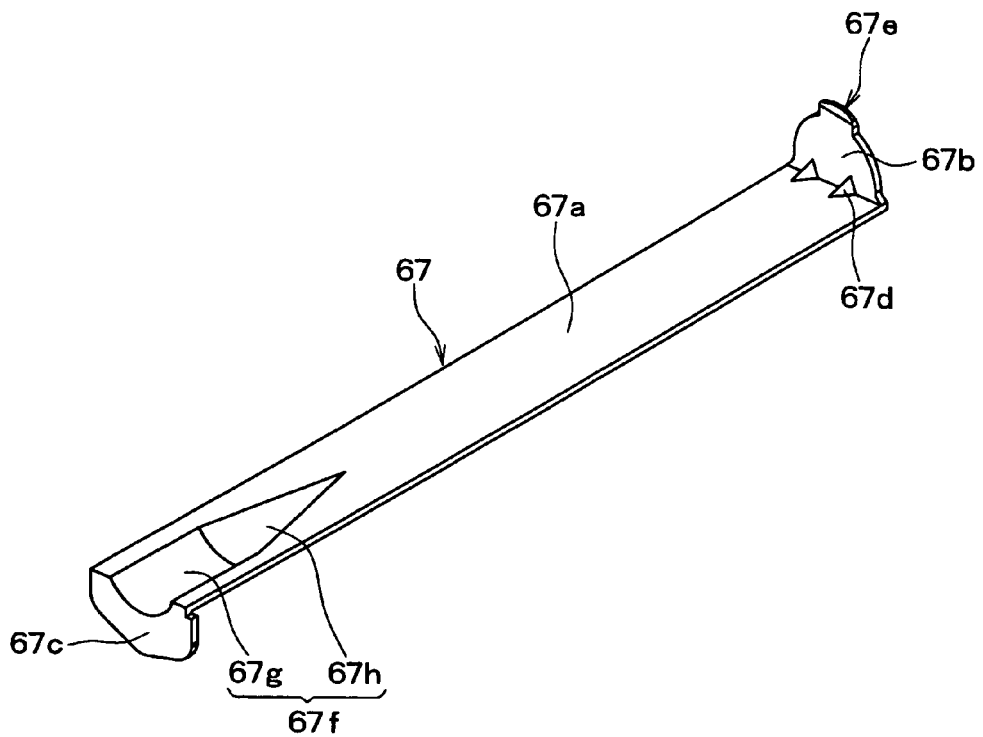
FIG. 8 is a schematic perspective view of a partition plate of the integrated unit in the first embodiment.

The partition plate 67 is a member made of aluminum material and brazed to the inner wall surface of the upper tank 18b. The partition plate 67 has a plate-like shape extending in the longitudinal direction of the upper tank 18b as a whole as shown in FIG. 8.

More specifically, the partition plate 67 includes a flat plate surface 67a extending in the longitudinal direction of the upper tank 18b, and first and second bent portions 67b and 67c, which are bent at both ends in the longitudinal direction of the flat plate surface 67a approximately at right angles in the opposite directions from each other. The flat plate surface 67a corresponds to a plate surface in the invention. The first bent portion 67b is an example of a bent portion in the invention.

The first bent portion 67b is bent upward from one end on the side of the flat plate surface 67a (right side shown in FIG. 4) closer to the downstream side end 17d of the capillary tube 17a. The second bent portion 67c is bent downward from the other end of the flat plate surface 67a.

As shown in FIG. 5, the flat plate surface 67a is inclined so as to be lowered toward the side of the first evaporator 15 from one side of the second evaporator 18. Ribs 67d protruding in a triangle shape toward the flat plate surface 67a side are integrally formed with the root of the first bent portion 67b. The ribs 67d enhance the rigidity of the first bent portion 67b so as to keep an angle of bending of the first bent portion 67b at a right angle.

As shown in FIG. 4, a claw portion 67e protruding upward from the tip (upper end) of the first bent portion 67b penetrates the slit-like hole 68 on the upper surface of the upper tank 18b to be caulked to the upper tank 18b. This can temporarily fix the partition plate 67 to the upper tank 18b.

The first bent portion 67b is formed in the partition plate 67, so that the lower space 70 is expanded upward around the downstream side end 17d (right end as shown in FIG. 4) of the capillary tube 17a with respect to the first bent portion 67b. That is, the upper space 69 is not formed in the space around the downstream side end 17d of the capillary tube 17a in the right space 28, but the lower space 70 is formed over the entire vertical area of the right space 28.

As shown in FIG. 8, a recess 67f recessed toward the lower space 70 is formed at the end portion of the flat plate surface 67a of the partition plate 67 on the side of the second bent portion 67c (left end side as shown in FIG. 8). The recess 67f includes a cylindrical concave portion 67g and a conical concave portion 67h.

The cylindrical concave portion 67g has such a shape that extends in the longitudinal direction of the flat plate surface 67a at the end of the flat plate surface 67a on the second bent portion 67c side (left end shown in FIG. 8). The conical concave portion 67h is positioned on the side of the first bent portion 67b (right end side shown in FIG. 8) with respect to the cylindrical concave portion 67g, and formed continuously with the cylindrical concave portion 67g. The concave portion 67h has such a shape that is made deeper as toward the cylindrical concave portion 67g and becomes swallow as the portion 67h is apart from the cylindrical concave portion 67g.

The ejector 14 is made of metallic material, such as copper or aluminum. Alternatively, the ejector 14 may be made of resin (non-metallic material). The ejector 14 is inserted into the upper tank 18b, while penetrating the ejector-insertion hole 63 of the connection block 23 and a hole of the main passage side opening 64a of the interposing plate 64 after an assembly step (brazing step) of integrally brazing the first and second evaporators 15 and 18.

The tip portion of the ejector 14 in the longitudinal direction shown in FIG. 3 is provided with the outlet 14e of the ejector 14 shown in FIG. 1. The tip portion of the ejector 14 is inserted into the cylindrical portion 65b of the ejector fixing plate 65, and then sealed and fixed using an O-ring 29a.

As shown in FIG. 4, the tip portion of the ejector 14 is positioned to partly cover the flat plate surface 67a of the partition plate 67 in the vertical direction. The recess 67f is formed in the partition plate 67, and the outer peripheral surface of the diffuser 14d of the ejector 14 is positioned above the cylindrical concave portion 67g of the recess 67f. Thus, the entire tip portion of the ejector is opened to the upper space 69 in the right space 28 of the upper tank 18b. The refrigerant suction port 14b of the ejector 14 is in communication with the left space 27 of the upper tank 18b of the second evaporator 18.

Turning back to FIG. 3, a lateral partition plate 30 is disposed substantially in the center area of the inner space of the upper tank 15b of the first evaporator 15 in the longitudinal direction. The lateral partition plate 30 partitions the inner space of the upper tank 15b into two spaces in the longitudinal direction, that is, the left space 31 and a right space 32.

The left space 31 serves as a collecting tank for collecting the refrigerant having passed through the tubes 21 of the first evaporator 15. The right space 32 serves as a distribution tank for distributing the refrigerant among the tubes 21 of the first evaporator 15.

As shown in FIGS. 4 and 5, a concave portion 61c is formed at a part of the flat plate surface 61a of the opposite-tube side half-divided member 61 of the upper and lower tanks 15b and 18b. The part is positioned in the upper space 69 of the right space 28 within the upper tank 18b.

The concave portions 61c are arranged in the direction of lamination of the tubes 21 (in the left/right direction shown in FIG. 4). A plurality of communication holes 71 are formed in a space enclosed by the concave portions 61c and the flat plate surface 60a of the tube side half-divided member 60 of the upper tanks 15b and 18b.

The upper space 69 in the right space 28 of the upper tank 18b is in communication with the right space 32 of the upper tank 15b of the first evaporator 15 via the communication holes 71.

Alternatively, these concave portions 61c may be formed to be connected in the form of one unit, and thus the communication hole 71 may be formed substantially over the entire lateral area of the upper space 69 (in the direction of lamination of the tubes 21).

The inlet side end of the ejector 14 (left end shown in FIG. 3) corresponds to an inlet of the nozzle portion 14a shown in FIG. 1. The inlet side end is fitted into the inner peripheral surface of the cylindrical portion 64d of the interposing plate 64 using an O-ring 29b, and then sealed and fixed thereto.

In this embodiment, the ejector 14 is fixed in the longitudinal direction in the following way. First, the ejector 14 is inserted from the ejector-insertion hole 63 of the connection block 23 into the upper tank 18b, and a fixing member 77 is fixed to the connection block 23.

The fixing member 77 is a member for fixing the thermal expansion valve 13 to the connection block 23. In this embodiment, the fixing member 77 is made of resin material (for example, polybutylene terephthalate) having the excellent vibration attenuation effect and mechanical strength, and the like.

The fixing member 77 is integrally formed with a cylindrical plug 78 inserted into the ejector-insertion hole 63, and a spacer 79 protruding from a part of the peripheral edge of the plug 78 (lower part shown in FIG. 3) in the axial direction.

Thus, the fixing of the fixing member 77 to the connection block 23 causes the spacer 79 to push the inlet side end of the ejector 14 in the direction of insertion of the ejector 14 thereby to fix the ejector 14 in the longitudinal direction, while allowing the plug 78 to close the ejector-insertion hole 63 of the connection block 23.

When the spacer 79 is formed in a simple cylindrical shape to protrude from the entire peripheral edge of the plug 78, the main passage 25a of the connection block 23 may be closed by and covered with the spacer 79.

By contrast, in this embodiment, the spacer 79 is formed to protrude only from a part of the peripheral edge of the plug 78. This can fix the ejector 14 in the longitudinal direction without closing and covering the main passage 25a of the connection block 23.

The outer peripheral surface of the cylindrical plug 78 is fitted into the inner peripheral surface of the ejector-insertion hole 63 of the connection block 23 using the O-ring 29c, and sealed and fixed thereto.

The fixing member 77 is provided with a hole portion 80 on the refrigerant inlet side in communication with the refrigerant inlet 25 of the connection block 23, and a hole portion 81 on the refrigerant outlet side in communication with the refrigerant outlet 26 of the connection block 23.

As shown in FIG. 2, the hole portion 80 on the refrigerant inlet side is connected to a first flow path 13b of the thermal expansion valve 13 for allowing the liquid refrigerant from the liquid receiver 12a to flow toward the hole portion 80 after passing through the expansion valve 13. The hole portion 81 on the refrigerant outlet side is connected to a second flow path 13c of the thermal expansion valve 13 for allowing the refrigerant to flow toward the suction side of the compressor 11 via the second flow path 13c.

As shown in FIG. 3, the outer peripheral surface of the peripheral edge of the refrigerant outlet 26 in the connection block 23 is fitted into the inner peripheral surface of the hole portion 81 on the refrigerant outlet side of the fixing member 77 using the O-ring 29d, and then sealed and fixed thereto. Similarly, the outer peripheral surface of the peripheral edge of the refrigerant inlet 25 in the connection block 23 is fitted into the inner peripheral surface of the hole portion 80 on the refrigerant inlet side of the fixing member 77 using an O-ring (not shown), and then sealed and fixed thereto.

The outer peripheral surface of the peripheral edge of the hole portion 81 on the refrigerant outlet side in the fixing member 77 is fitted into the inner peripheral surface of the second flow path 13c of the thermal expansion valve 13 using the O-ring 29e, and then sealed and fixed thereto. Similarly, the outer peripheral surface of the peripheral edge of the hole portion 80 on the refrigerant inlet side in the fixing member 77 is fitted into the inner peripheral surface of the first flow path 13b of the thermal expansion valve 13 using an O-ring 29f, and then sealed and fixed thereto.

In the connection block 23, one screw hole 82 and a pair of screw holes 83 arranged with the hole 82 interposed therebetween are opened in the intermediate position between the refrigerant inlet 25 and the refrigerant outlet 26 on the side opposite to the tanks 15b and 18b of the evaporators 15 and 18 (outer side).

In the fixing member 77, one screw hole 84 and a pair of screw holes 85 arranged with the hole 84 interposed therebetween are opened in the intermediate position between the hole portion 80 on the refrigerant inlet side and the hole portion 81 on the refrigerant outlet side. A pair of screw holes 86 are opened in the intermediate position between the first and second flow paths 13b and 13c of the thermal expansion valve 13.

The connection block 23 and the fixing member 77 can be connected by screws using the one screw hole 82 of the connection block 23 and the one screw hole 84 of the fixing member 77 among these screw holes. The connection block 23 and the thermal expansion valve 13 can be connected via the fixing member 77 by screws using the pair of screw holes 83 of the connection block 23, the pair of screw holes 85 of the fixing member 77, and the pair of screw holes 86 of the thermal expansion valve 13.

As can be seen from FIG. 2, in this embodiment, the direction of mounting of the thermal expansion valve 13 is in parallel with the longitudinal direction of the ejector 14.

As shown in FIGS. 4 and 5, a refrigerant retaining plate 75 is disposed in the lower space 70 of the right space 28 within the upper tank 18b. The refrigerant retaining plate 75 is a member which serves to uniformly distribute the refrigerant among the tubes 21 of the second evaporator 18, and which is made of aluminum material. The plate 75 has a plate shape with a mountain-like section shown in FIG. 9, and the mountain-like section extends in the direction of lamination of the tubes 21 (in the left/right direction shown in FIG. 4).

Figure 9:
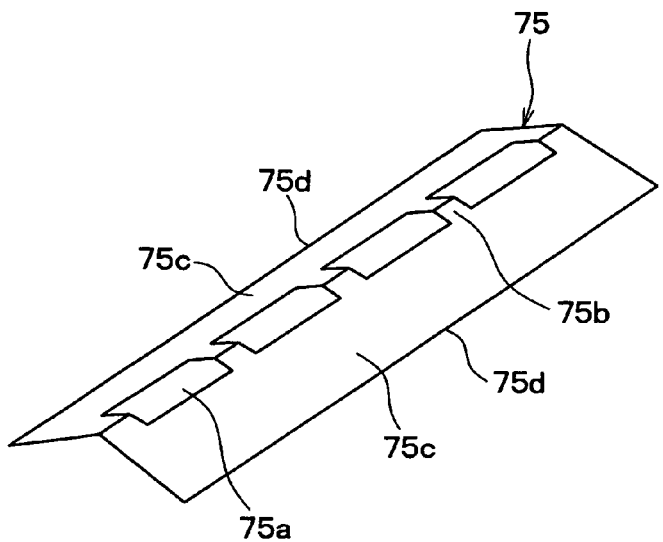
FIG. 9 is a schematic perspective view of a refrigerant retaining plate of the integrated unit in the first embodiment.

As shown in FIG. 9, hole portions 75a are formed by being punched in a rectangular shape at the top area of the mountain-like section of the refrigerant retaining plate 75. The rectangular hole portions 75a are formed in the longitudinal direction of the refrigerant retaining plate 75, so that each of remaining parts between the hole portions 75a without being punched forms a connection portion 75b with a mountain-like section. The connection portions 75b can ensure the rigidity of the refrigerant retaining plate 75 even with the hole portions 75a.

As shown in FIG. 5, an end 75d located on a side of a hem 75c of the mountain-like section of the refrigerant retaining plate 75 is mounted on the upper end surface of the tube 21, and brazed to the inner wall surface extending vertically with respect to the tube side half-divided member 60 of the upper tank 18b. Thus, a valley-like retaining portion 76 is formed between the inner wall surface of the upper tank 18b and the hem 75c of the refrigerant retaining plate 75.

In this embodiment, the ejector fixing plate 65 partitions the inside of the upper tank 18b of the second evaporator 18 into the left and right spaces 27 and 28. The left space 27 serves as the collecting tank for collecting the refrigerant from the tubes 21, and the right space 28 serves as the distribution tank for distributing the refrigerant among the tubes 21. The ejector 14 has an elongated shape extending in the axial direction of the nozzle portion 14a. The longitudinal direction of the elongated shape is identical to the longitudinal direction of the upper tank 18b, so that the ejector 14 is positioned in parallel with the upper tank 18b.

With this arrangement, the ejector 14 and the evaporator 18 can be arranged compactly, and thus the components of the entire unit can be organized in a compact manner. Furthermore, the ejector 14 is disposed in the left space 27 serving as the collecting tank, and the refrigerant suction port 14b is set to be directly opened in the collecting tank. This arrangement can decrease the number of refrigerant pipes.

This arrangement provides an advantage that only one tank can achieve the collection of the refrigerant from the tubes 21 and the supply of the refrigerant (suction of the refrigerant) into the ejector 14.

In this embodiment, the first evaporator 15 is disposed adjacent to the second evaporator 18, and the downstream side end of the ejector 14 is disposed adjacent to the distribution tank of the first evaporator 15 (the right space 32 of the upper tank 15b). This arrangement provides an advantage that a refrigerant supply route from the ejector outlet to the first evaporator 15 can be easily constructed even when the ejector 14 is incorporated in the second evaporator 18.

Figure 10:
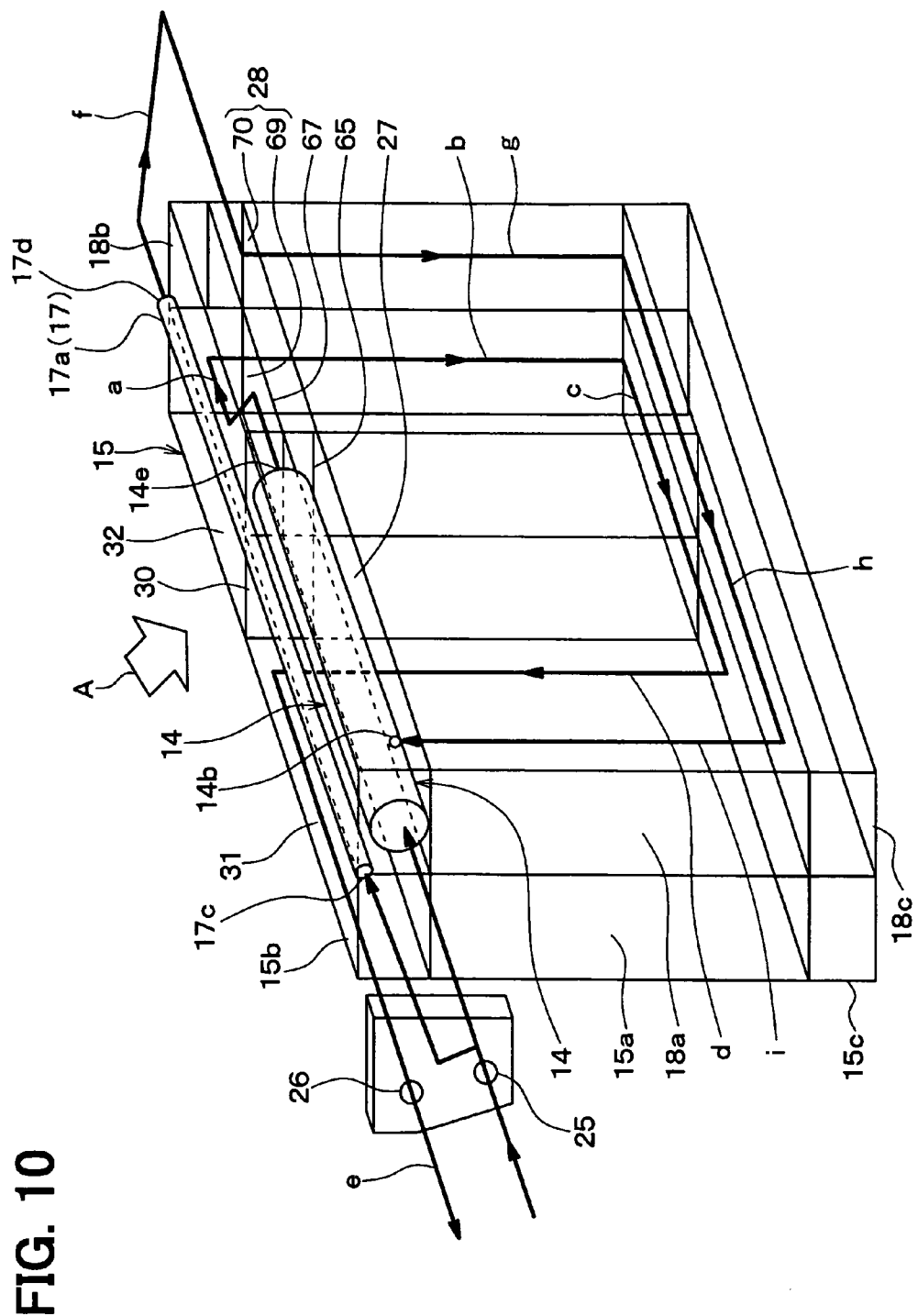
FIG. 10 is a schematic perspective view showing the structure of refrigerant passages in the integrated unit in the first embodiment.

With this arrangement, the refrigerant flow paths in the entire integrated unit 20 will be described specifically with reference to FIGS. 3, 4, and 10. FIG. 10 is a schematic perspective view showing the refrigerant flow paths in the entire integrated unit 20.

The refrigerant inlet 25 of the connection block 23 is branched into the main passage 25a and the branch passage 16. The refrigerant in the main passage 25a passes through the main passage side opening 64a of the interposing plate 64, and then through the ejector 14 (from the nozzle portion 14a to the mixing portion 14c, and the diffuser 14d) to be decompressed. Thereafter, the low-pressure refrigerant decompressed flows into the right space 32 of the upper tank 15b of the first evaporator 15 through the upper space 69 of the right space 28 in the upper tank 18b and the communication holes 71 as indicated by the arrow "a".

The refrigerant in the right space 32 flows downwardly the tubes on the right side of the heat-exchange core portion 15a as indicated by the arrow "b", and then flows into the right side of the lower tank 15c. Since no partition plate is provided in the lower tank 15c, the refrigerant moves from the right side of the lower tank 15c to the left side thereof as indicated by the arrow "c".

The refrigerant on the left side of the lower tank 15c flows upwardly through the tubes 21 on the left side of the heat-exchange core portion 15a as indicated by the arrow "d", and then flows into the left space 31 of the upper tank 15b. Further, the refrigerant therefrom flows into the refrigerant outlet 26 of the connection block 23 as indicated by the arrow "e".

In contrast, the refrigerant in the branch passage 16 of the connection block 23 is first decompressed through the capillary tube 17a. The decompressed low-pressure refrigerant (gas-liquid two-phase refrigerant) flows into the lower space 70 of the right space 28 in the upper tank 18b of the second evaporator 18 as indicated by the arrow "f".

The refrigerant flowing into the lower space 70 flows downwardly through the tubes 21 on the right side of the heat-exchange core portion 18a as indicated by the arrow "g", and then flows into the right side of the lower tank 18c. Since no partition plate is provided in the lower tank 18c, the refrigerant moves from the right side of the lower tank 18c to the left side as indicated by the arrow "h".

The refrigerant on the left side of the lower tank 18c flows upwardly through the tubes 21 on the left side of the heat-exchange core portion 18a as indicated by the arrow "i", and then flows into the left space 27 of the upper tank 18b. Since the refrigerant suction port 14b of the ejector 14 is in communication with the left space 27, the refrigerant in the left space 27 is drawn from the refrigerant suction port 14b into the ejector 14.

The integrated unit 20 has the structure of the refrigerant flow paths as mentioned above. Thus, only one refrigerant inlet 25 may be provided in the connection block 23 in the entire integrated unit 20, and only one refrigerant outlet 26 may also be provided in the connection block 23.

Now, the operation of the first embodiment will be described below. When the compressor 11 is driven by the vehicle engine, the high-temperature and high-pressure refrigerant compressed and discharged by the compressor 11 flows into the radiator 12. The high-temperature refrigerant is cooled and condensed by the outside air in the radiator 12. The high-pressure refrigerant flowing from the radiator 12 flows into the liquid receiver 12a, in which the refrigerant is separated into gas and liquid phases. The liquid refrigerant is guided from the liquid receiver 12a to pass through the thermal expansion valve 13.

The thermal expansion valve 13 has an opening degree of valve (refrigerant flow amount) adjusted such that a degree of superheat of the refrigerant at the outlet of the first evaporator 15 (i.e., the refrigerant drawn into the compressor) is a predetermined value thereby to decompress the high-pressure refrigerant. The refrigerant having passed through the thermal expansion valve 13 has an intermediate pressure, and flows into the one refrigerant inlet 25 provided in the connection block 23 of the integrated unit 20 through the hole portion 80 on the refrigerant inlet side of the fixing member 77.

The refrigerant flow is divided into a refrigerant stream directed from the main passage 25a of the connection block 23 to the nozzle portion 14a of the ejector 14, and a refrigerant stream directed from the refrigerant branch passage 16 of the connection block 23 to the capillary tube 17a.

The refrigerant flow entering the nozzle portion 14a of the ejector 14 is decompressed and expanded by the nozzle portion 14a. Thus, the pressure energy of the refrigerant is converted to the velocity energy thereof at the nozzle portion 14a. The refrigerant from an ejection port of the nozzle portion 14a is ejected at high velocity. The decrease in refrigerant pressure at the ejection time sucks the refrigerant (gas-phase refrigerant) having passed through the second evaporator 18 of the branch refrigerant passage 16 from the refrigerant suction port 14b.

The refrigerant ejected from the nozzle portion 14a and the refrigerant drawn into the refrigerant suction port 14b are mixed by the mixing portion 14c disposed on the downstream side of the nozzle portion 14a to flow into the diffuser 14d. The velocity (expansion) energy of the refrigerant is converted to the pressure energy thereof by enlarging the passage area in the diffuser 14d, resulting in an increased pressure of the refrigerant.

The refrigerant flowing from the diffuser 14d of the ejector 14 flows through the refrigerant flow paths in the first evaporator 15 as indicated by the arrows "a" to "e" of FIG. 10. During this time, in the heat-exchange core portion 15a of the first evaporator 15, the low-temperature and low-pressure refrigerant absorbs heat from the blown air indicated by the arrow "A" to evaporate. The gas-phase refrigerant after evaporation is drawn from the one refrigerant outlet 26 into the compressor 11 through the refrigerant outlet side hole portion 81 of the fixing member 77 and the second flow path 13c of the thermal expansion valve 13, and compressed again by the compressor 11.

In contrast, the refrigerant flow entering the refrigerant branch passage 16 is decompressed by the capillary tube 17a to be low-pressure refrigerant (gas-liquid two-phase refrigerant), which flows through the refrigerant flow paths in the second evaporator 18 as indicated by the arrows "f" to "i" of FIG. 10. During this time, in the heat-exchange core portion 18a of the second evaporator 18, the low-temperature and low-pressure refrigerant absorbs heat from the blown air having passed through the first evaporator 15 to evaporate. The gas-phase refrigerant after evaporation is drawn from the refrigerant suction port 14b into the ejector 14.

As mentioned above, according to this embodiment, the refrigerant on the downstream side of the diffuser 14d of the ejector 14 can be supplied to the first evaporator 15, while the refrigerant on the branch passage 16 side can be supplied to the second evaporator 18 through the capillary tube (throttle mechanism) 17a, so that the first and second evaporators 15 and 18 can exhibit the cooling effect at the same time. Thus, the cold air cooled by both the first and second evaporators 15 and 18 is blown off into the space to be cooled, thereby refrigerating (cooling) the space to be cooled.

At this time, the refrigerant evaporation pressure of the first evaporator 15 is a pressure of the refrigerant whose pressure is increased by the diffuser 14d. In contrast, since the outlet side of the second evaporator 18 is connected to the refrigerant suction port 14b of the ejector 14, the lowest pressure of the refrigerant directly after the decompression by the nozzle portion 14a can be applied to the second evaporator 18.

Thus, the refrigerant evaporation pressure (refrigeration evaporation temperature) of the second evaporator 18 can be lower than that of the first evaporator 15. The first evaporator 15 whose refrigerant evaporation temperature is higher is disposed on the upstream side with respect to the flow direction "A" of the blown air, while the second evaporator 18 whose refrigerant evaporation temperature is lower is disposed on the downstream side. This can ensure both a difference between the refrigerant evaporation temperature of the first evaporator 15 and the temperature of the blown air, and a difference between the refrigerant evaporation temperature of the second evaporator 18 and the temperature of the blown air.

Thus, both the first and second evaporators 15 and 18 can effectively exhibit cooling capacities. Therefore, the cooling capacity for the common space to be cooled can be improved effectively by the combination of the first and second evaporators 15 and 18. The suction pressure of the compressor 11 can be increased by a pressure increasing effect of the diffuser 14d to decrease a driving power of the compressor 11.

The refrigerant flow amount on the second evaporator 18 side can be adjusted independently by the capillary tube (throttle mechanism) 17 without depending on the function of the ejector 14, while the refrigerant flow amount into the first evaporator 15 can be adjusted by a restriction property of the ejector 14. This can facilitate adjustment of the refrigerant flow amounts into the first and second evaporators 15 and 18 according to respective thermal loads.

Under the condition of a small cycle thermal load, a difference in pressure of the cycle is decreased, so that the input of the ejector 14 becomes small. In this case, when the flow amount of the refrigerant passing through the second evaporator 18 depends only on the refrigerant suction capacity of the ejector 14, the decrease in refrigerant flowing into the nozzle portion 14a of the ejector 14 may lead to a decrease in refrigerant suction capacity of the ejector 14, resulting in a decrease in flow amount of the refrigerant in the second evaporator 18. This may make it difficult to ensure the cooling capability of the second evaporator 18.

In this respect, in this embodiment, the refrigerant branch passage 16 is connected in parallel to the ejector 14 because the refrigerant having passed through the thermal expansion valve 13 is branched on the upstream side of the ejector 14 and the branched refrigerant is drawn into the refrigerant suction port 14b through the refrigerant branch passage 16.

Thus, the refrigerant can be supplied to the refrigerant branch passage 16 using not only the refrigerant suction capacity of the ejector 14, but also the refrigerant suction and discharge capacities of the compressor 11. Even when the input of the ejector 14 is decreased to reduce the refrigerant suction capacity of the ejector 14, the degree of a decrease in flow rate of the refrigerant on the second evaporator 18 side can be reduced to a smaller level. Thus, even under the condition of the low thermal load, the cooling capability of the second evaporator 18 can be easily ensured.

In this embodiment, the ejector 14, the first and second evaporators 15 and 18, and the capillary tube 17a serving as the fixed throttle are assembled as one structure as shown in FIG. 2, that is, as the integrated unit 20. Thus, the entire integrated unit 20 requires only one refrigerant inlet 25 and one refrigerant outlet 26.

As a result, the entire integrate unit 20 incorporating the above-described components (14, 15, 18, 17a) has the one refrigerant inlet 25 connected to the outlet side of the thermal expansion valve 13, and the one refrigerant outlet 26 connected to the suction side of the compressor 11 in mounting the refrigerant cycle device 10 on the vehicle.

At the same time, the use of the structure incorporating the ejector 14 and the capillary tube 17a in the evaporator tank (see FIG. 3) can make the entire body of the integrated unit 20 compact and simple as shown in FIG. 2, thereby reducing the space for mounting the unit.

This can improve the mounting property of the refrigerant cycle device 10 including the evaporators 15 and 18 on the vehicle, resulting in a decrease in number of components of the refrigerant cycle device 10, and further in a decrease in cost.

Further, the user of the integrated unit 20 can exhibit associated effects, including improvement of the cooling capability, to be described later. That is, the integrated unit 20 can reduce the length of each connection passage between the respective components (14, 15, 18, and 17a) to a small value. This can reduce the loss in pressure in the refrigerant flow path, and also can effectively reduce the heat exchange between the low-pressure refrigerant and the peripheral atmosphere at the same time. Thus, the cooling capabilities of the first and second evaporators 15 and 18 can be improved.

In particular, the evaporation pressure of the second evaporator 18 can be reduced by a decrease in loss of pressure, which is caused by the abolishment of the connection pipe between the outlet side of the second evaporator 18 and the ejector refrigerant suction port 14b. This can effectively improve the cooling capability of the second evaporator 18 without increasing the consumed power of the compressor.

Since the ejector 14 is disposed under the low temperature atmosphere in the evaporator tank, a thermal insulation process of the ejector 14 (adhesion of a thermal insulating material) can be abolished.

The communication holes 71 are arranged in the direction of lamination of tubes 21 in the upper space 69 of the right space 28 in the upper tank 18b. That is, the communication holes 71 are arranged in such a direction that the tip portion of the ejector 14 is open. Thus, the refrigerant discharged from the tip portion of the ejector 14 into the upper space 69 is distributed well among the communication holes 71 as indicated by the arrow "a" to flow into the right space 32 (distribution tank) of the upper tank 15b of the first evaporator 15.

In this way, the refrigerant discharged from the ejector 14 flows smoothly from the upper space 69 to the right space 32, which can reduce the loss in pressure of the refrigerant.

Further, the refrigerant having passed through the communication holes 71 is distributed in the direction of lamination of the tubes 21 to flow into the right space (distribution tank) 32. This can equalize the distribution of the refrigerant among the tubes 21 of the first evaporator 15.

As indicated by the arrow "j" in FIG. 5, the liquid refrigerant among the gas-liquid two-phase refrigerant flowing from the downstream side end 17*d* of the capillary tube 17*a* into the lower space 70 is temporarily stored in the valley-like retaining portions 76 formed in the hems 75*c* of the refrigerant retaining plate 75. The liquid refrigerant overflowing from the valley-like retaining portion 76 falls toward the tubes 21 side through the rectangular holes 75*a* of the refrigerant retaining plate 75.

Thus, the liquid refrigerant can be guided on the side away from the downstream side end 17*d* of the capillary tube 17*a* in the lower space (distribution tank) 70. As a result, the liquid refrigerant can be uniformly distributed among the tubes 21 inserted into the lower space 70, so that the temperature distribution of the cold air cooled by the second evaporator 18 can be equalized.

In this embodiment, the plug 78 and the spacer 79 are integrally formed with the fixing member 77, thereby it can reduce the number of the components and further the cost as compared to the case where the fixing member 77, the plug 78, and the spacer 79 are individually formed.

As mentioned above, the fixing of the fixing member 77 to the connection block 23 causes the spacer 79 to push the inlet side end of the ejector 14 in the direction of insertion of the ejector 14 thereby to fix the ejector 14 in the longitudinal direction, while allowing the plug 78 to close the ejector-insertion hole 63 of the connection block 23. The connection block 23 and the thermal expansion valve 13 are connected by the screws through the fixing member 77.

Thus, the fixing member 77 contributes the vibration transmission route leading from the thermal expansion valve 13 to the inlet side end of the ejector 14. The fixing member 77 is made of the resin material, and thus can suppress the transmission of the vibration of the thermal expansion valve 13 to the ejector 14. This is because the resin material is soft and thus can attenuate the vibration as compared to the metallic material.

In particular, in this embodiment, the fixing member 77 is made of polybutylene terephthalate having both the excellent vibration attenuation effect and mechanical strength, so that the fixing member 77 can exhibit the effect of attenuating the vibration, and can also ensure the mechanical strength required as the fixing member 77.

In this embodiment, since the refrigerant cycle device 10 is suitable for use in a vehicle, the fixing member 77 is disposed in an engine room or a compartment of the vehicle. The resin material for the fixing member 77 is required to have not only the excellent vibration attenuation effect and mechanical strength, but also high and low temperature resistance (of about −30° C. to +80° C.), weather resistance, resistance to hydrolysis, greaseproof (resistance to oil, including lubricating oil, fuel oil, refrigeration oil, or the like), and acid and alkaline resistance.

In this respect, in this embodiment, the fixing member 77 is made of the polybutylene terephthalate, and thus ensures the necessary properties specific to the refrigerant cycle device for a vehicle.

Even when the fixing member 77 is made of the metallic material, the heavier fixing member 77 can further suppress the transmission of the vibration of the thermal expansion valve 13 to the ejector 14. Specifically, it is found that the fixing member 77 whose weight is 20 g or more can provide the good effect of suppressing the transmission of the vibration.

Figure 11:
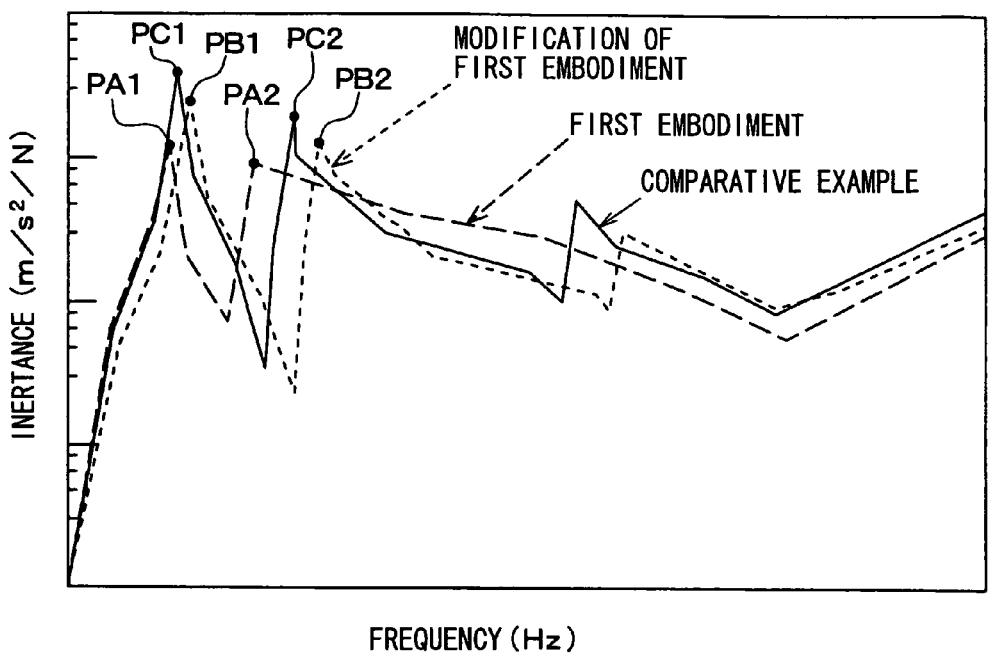
FIG. 11 is a graph showing relationships between the inertance and the generated frequency in the first embodiment, in a modification of the first embodiment and a comparative example.
Figure 21:
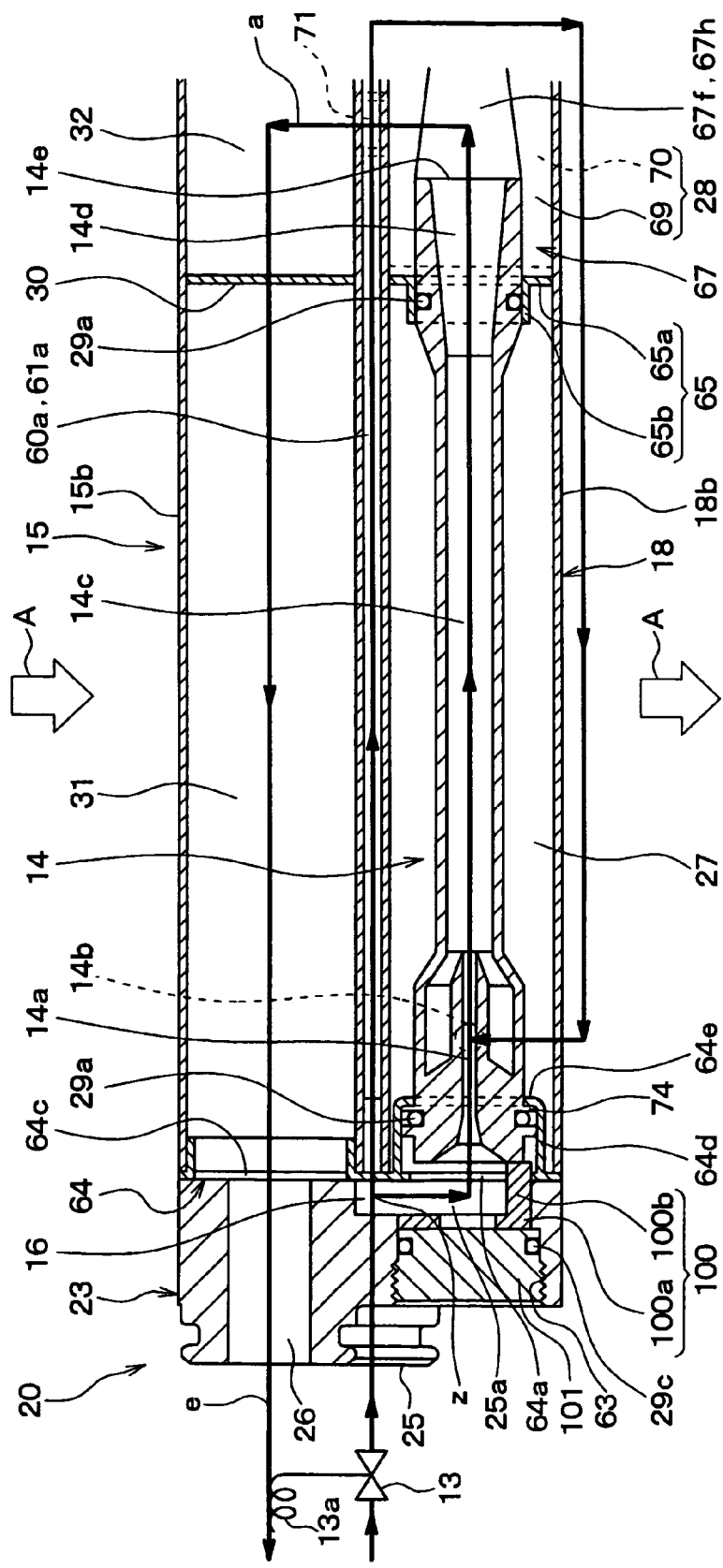
FIG. 21 is a schematic sectional view of an evaporator tank on a side of a connection block in a comparative example.

FIG. 11 is a graph showing relationships between the inertance and the generated frequency in the first embodiment, a modified example (modification) of the first embodiment and a comparison example shown in FIG. 21. In the modified example of this embodiment, the material of the fixing member 77 is changed to aluminum, and the weight of the fixing member 77 is 22 g or more. The measurement of the inertance is performed by measuring vibration of the thermal expansion valve 13 caused when the thermal expansion valve 13 is busted by a hammer using a vibration measurement device (vibration pick) attached to the ejector 14. In the graph of FIG. 11, the inertance on the longitudinal axis is represented by a logarithmic scale.

The points PA1 and PA2 shown in FIG. 11 indicate first and second peaks of the inertance in this embodiment. The points PB1 and PB2 indicate first and second peaks of the inertance in the modified example of this embodiment. The points PC1 and PC2 are first and second peaks of the inertance in the comparative example.

As can be seen in FIG. 11, by making comparisons among this embodiment, the modified example of this embodiment, and the comparative example of FIG. 21, the following has been found. The first and second peaks of the inertance in this embodiment are the smallest, the first and second peaks in the modified example are the second smallest, and the first and second peaks in the comparative example are the largest.

Thus, in this embodiment and the modified example of this embodiment, the vibration of the thermal expansion valve 13 can be suppressed from being transmitted to the ejector 14, thereby it can suppress the vibration of the ejector 14 as compared to the comparative example. As a result, the transmission of vibration of the ejector 14 to the entire integrated unit 20 can reduce the radiated sound (abnormal sounds) generated from the integrated unit 20.

The results of measurement of the radiated sound performed by the inventors of the present application have shown that the radiated sound in this embodiment can be reduced by about 4 dB as compared to that in the comparative example, and also that the radiated sound in the modified example of this embodiment can be reduced by about 3 dB as compared to that in the comparative example.

The measurement conditions of the radiated sound are as follows: refrigerant pressure on the upstream side of the thermal expansion valve 13 is 1.47 MPa (G); refrigerant pressure at the outlet of the first evaporator 15 is 0.198 MPa (G); inflow air temperature at the first evaporator 15 is 32° C., and the number of revolutions Nc of the compressor 11 is 1000 rpm. The sound pressure of the radiated sound generated in actuation of the refrigerant cycle is measured by a microphone located at a distance of 30 cm from the second evaporator 18 on the leeward rear side.

Although in this embodiment, the thermal expansion valve 13 is disposed in the vicinity of the fixing member 77, the thermal expansion valve 13 may be spaced apart from the fixing member 77 by arranging a pipe (not shown) between the expansion valve 13 and the fixing member 77. This can attenuate the vibration between the thermal expansion valve 13 and the fixing member 77 to some extent, thereby further suppressing the transmission of vibration of the expansion valve 13 to the ejector 14.

Second Embodiment

Figure 12:
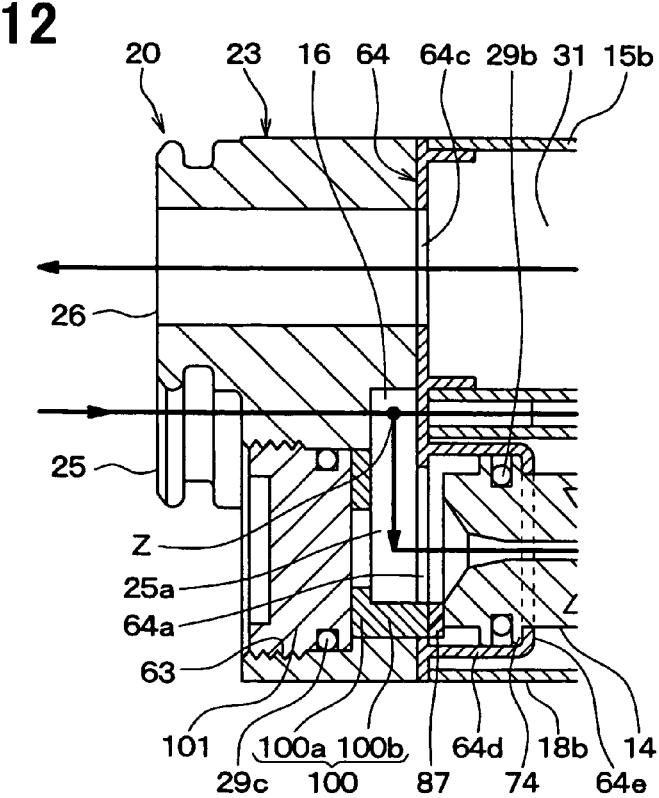
FIG. 12 is a schematic sectional view showing a part of an integrated unit according to a second embodiment of the invention.

In the above-described first embodiment, the fixing member 77 suppresses the transmission of vibration of the thermal expansion valve 13 to the ejector 14. However, in a second embodiment, the vibration of the expansion valve 13 is suppressed from being transmitted to the ejector 14 without using the fixing member 77, as shown in FIG. 12.

Similarly to the structure of FIG. 21, in the second embodiment, a connection block 23 for forming a refrigerant inlet 25 and a refrigerant outlet 26 is disposed on the side end of the header tank 18b in the longitudinal direction. An ejector-insertion hole 63 is provided in the connection block 23, and the ejector 14 is inserted from the hole 63 into the header tank 18b.

An interposing plate 64 is interposed between the connection block 23 and the side end of the header tank 18b in the longitudinal direction. In the interposing plate 64, a cylindrical portion 64d protruding into the header tank 18b in a cylindrical shape is formed concentrically with the ejector-insertion hole 63. A flange 64e bent radially inward in a ring shape is integrally formed at the tip of the protrusion of the cylindrical portion 64d.

An annular portion 74 protruding radially outward in an annular shape is formed on the outer peripheral surface of the ejector 14. The annular portion 74 is engaged with the flange 64e of the interposing plate 64 to define the position of insertion of the ejector 14.

After inserting the ejector 14 into the header tank 18b, a spacer 100 is inserted into the ejector-insertion hole 63, so that a male thread of a plug 101 is screwed with a female thread of the ejector-insertion hole 63.

Thus, the plug 101 pushes an annular main body 100a of the spacer 100 toward the ejector 14, so that the tip of a protruding piece 100b which protrudes from a part of the main body 100a of the spacer 100 is positioned adjacent to the side surface of the ejector 14 on the side of the nozzle portion 14a.

The integrated unit 20 of the second embodiment has the same basic structure as that of the comparative example shown in FIG. 21, but differs from the comparative example shown in FIG. 21 in that a buffer member 87 is disposed between the spacer 100 and the inlet side end of the ejector 14. In the second embodiment, the spacer 100 and the plug 101 are formed of metallic material, and the buffer member 87 is made of resin material having both the excellent vibration attenuation effect and mechanical strength (in this embodiment, polybutylene terephthalate, for example).

This avoids metallic contact between the spacer 100 and the ejector 14, enabling the buffer member 87 to buffer the vibration of the thermal expansion valve 13, so that the vibration of the expansion valve 13 can be suppressed from being transmitted to the ejector 14. As a result, the vibration of the ejector 14 can be transmitted to the entire integrated unit 20 to prevent occurrence of the radiated sound (abnormal sounds).

Particularly, in this embodiment, the buffer member 87 is made of polybutylene terephthalate having both excellent vibration attenuation effect and mechanical strength. Thus, the buffer member 87 can exhibit the effect of attenuating the vibration, and also can ensure the mechanical strength required for the buffer member 87.

In this embodiment, when the buffer 87 is disposed in the integrated unit 20, the resin material for the buffer member 87 is required to have not only the excellent vibration attenuation effect and mechanical strength, but also high and low temperature resistance (of about −30° C. to +80° C.), weather resistance, resistance to hydrolysis for moisture carried in the refrigerant cycle device, and greaseproof (resistance to oil, including lubricating oil, fuel oil, refrigeration oil, or the like).

In this respect, in this embodiment, the buffer member 87 is made of the polybutylene terephthalate, and thus ensures such properties, that is, the properties required for disposing the buffer member 87 in the integrated unit 20.

Even when the buffer member 87 is formed of rubber material (for example, ethylene propylene rubber, or nitrile rubber) having the excellent vibration attenuation effect, mechanical strength, high and low temperature resistance, weather resistance, resistance to hydrolysis, and greaseproof, it is apparent that the same effect as that of this embodiment can be exhibited.

In the second embodiment, the spacer 100 pushes the annular portion 74 of the ejector 14 against the flange 64e of the interposing plate 64 to fix the ejector 14 in the longitudinal direction. The other parts of the integrated unit 20 of the second embodiment, including the base structures of the ejector 14, the first and second evaporators 15, 18 and the throttle mechanism 17 may be similar to those of the above-described first embodiment.

Third Embodiment

In the above-described second embodiment of the present invention, the transmission of the vibration of the thermal expansion valve 13 to the ejector 14 is suppressed so as to reduce the radiated sound generated from the integrated unit 20. In a third embodiment of the present invention, the vibration of the ejector 14 is suppressed from being transmitted to the entire integrated unit 20, so as to reduce the radiated sound generated from the integrated unit 20.

Figure 13:
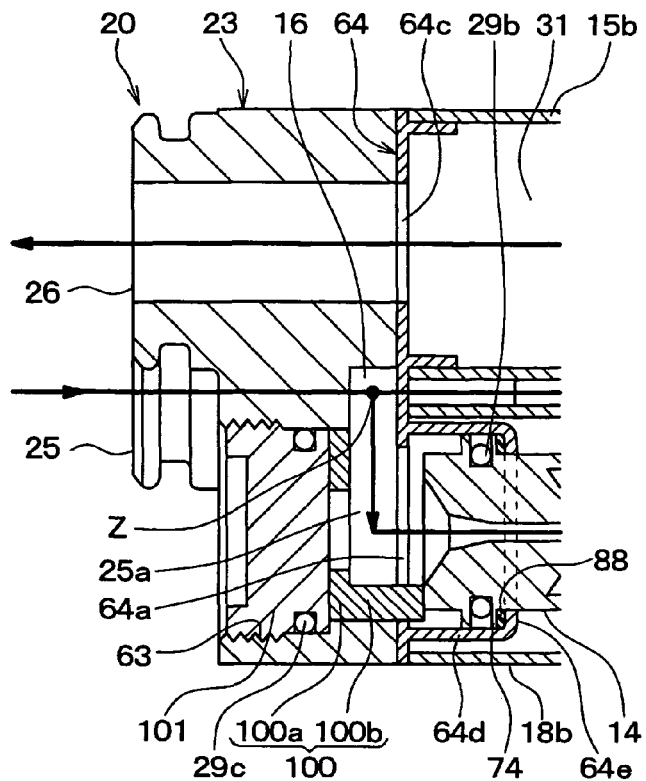
FIG. 13 is a schematic sectional view showing a part of an integrated unit according to a third embodiment of the invention.

The integrated unit 20 of the embodiment has the same basic structure as that in the comparative example shown in FIG. 21, but differs from the comparative example shown in FIG. 21 in that a buffer member 88 is disposed between an annular portion 74 of the ejector 14 and the flange 64e of the interposing plate 64 as shown in FIG. 13. In this embodiment, the buffer member 88 is formed of resin material (for example, polybutylene terephthalate) in the annular shape.

This avoids metallic contact between the ejector 14 and the interposing plate 64, enabling the buffer member 88 to buffer the vibration from the ejector 14 to the interposing plate 64, so that the vibration of the ejector 14 can be suppressed from being transmitted to the interposing plate 64, and further the entire integrated unit 20. This can reduce the radiated sound generated from the integrated unit 20.

Even when the buffer member 88 is formed of rubber material (for example, ethylene propylene rubber, or nitrile rubber), it is apparent that the same effect as that in this embodiment can be exhibited. Combination of this embodiment and the above-described second embodiment can further reduce the radiated sound. That is, both the buffer members 87, 88 can be located in the integrated unit 20 of the comparative example shown in FIG. 21.

Fourth Embodiment

Figure 14:
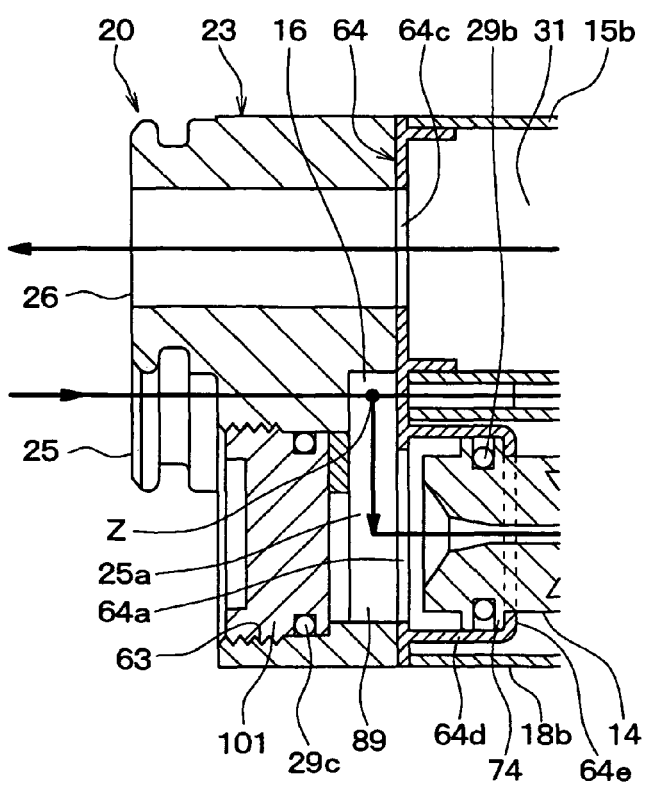
FIG. 14 is a schematic sectional view showing a part of an integrated unit according to a fourth embodiment of the invention.

In a fourth embodiment, as shown in FIG. 14, the spacer 100 and the buffer member 87 are removed from the above-described structure of the second embodiment. Thus, a void 89 (space portion) is formed overall between the plug 101 and the ejector 14, so as to avoid the direct contact between the spacer 100 shown in FIG. 12 and the ejector 14, thereby suppressing the transmission of the vibration of the thermal expansion valve 13 to the ejector 14.

In the second embodiment, the spacer 100 pushes the annular portion 74 of the ejector 14 against the flange 64e of the interposing plate 64 to fix the ejector 14 in the longitudinal direction. In contrast, in the fourth embodiment, because the spacer 100 is removed, the annular portion 74 of the ejector 14 cannot be pushed against the flange 64e of the interposing plate 64. However, even in the fourth embodiment, the ejector 14 can be fixed in the longitudinal direction without any problems for the following reason.

That is, when the refrigerant cycle is operating, the pressure on the inlet side of the nozzle portion 14a of the ejector 14 is constantly higher than the pressure on the outlet side of the ejector 14. Specifically, a differential pressure of about 0.5 MPa occurs under some conditions. This differential pressure can push the annular portion 74 of the ejector 14 against the flange 64e of the interposing plate 64.

When the refrigerant cycle is stopped, the pressure on the inlet side of the ejector 14 is equal to the pressure on the outlet side of the ejector 14. Thus, although the annular portion 74 of the ejector 14 cannot be pushed against the flange 64e of the interposing plate 64, a force that causes the annular portion 74 of the ejector 14 to be pushed back from the flange 64e of the interposing plate 64 is not applied to the annular portion, so that the ejector 14 is not misaligned in the longitudinal direction.

Thus, even in the fourth embodiment shown in FIG. 14, the ejector 14 can be fixed in the longitudinal direction without any problems.

Fifth Embodiment

Figure 15:
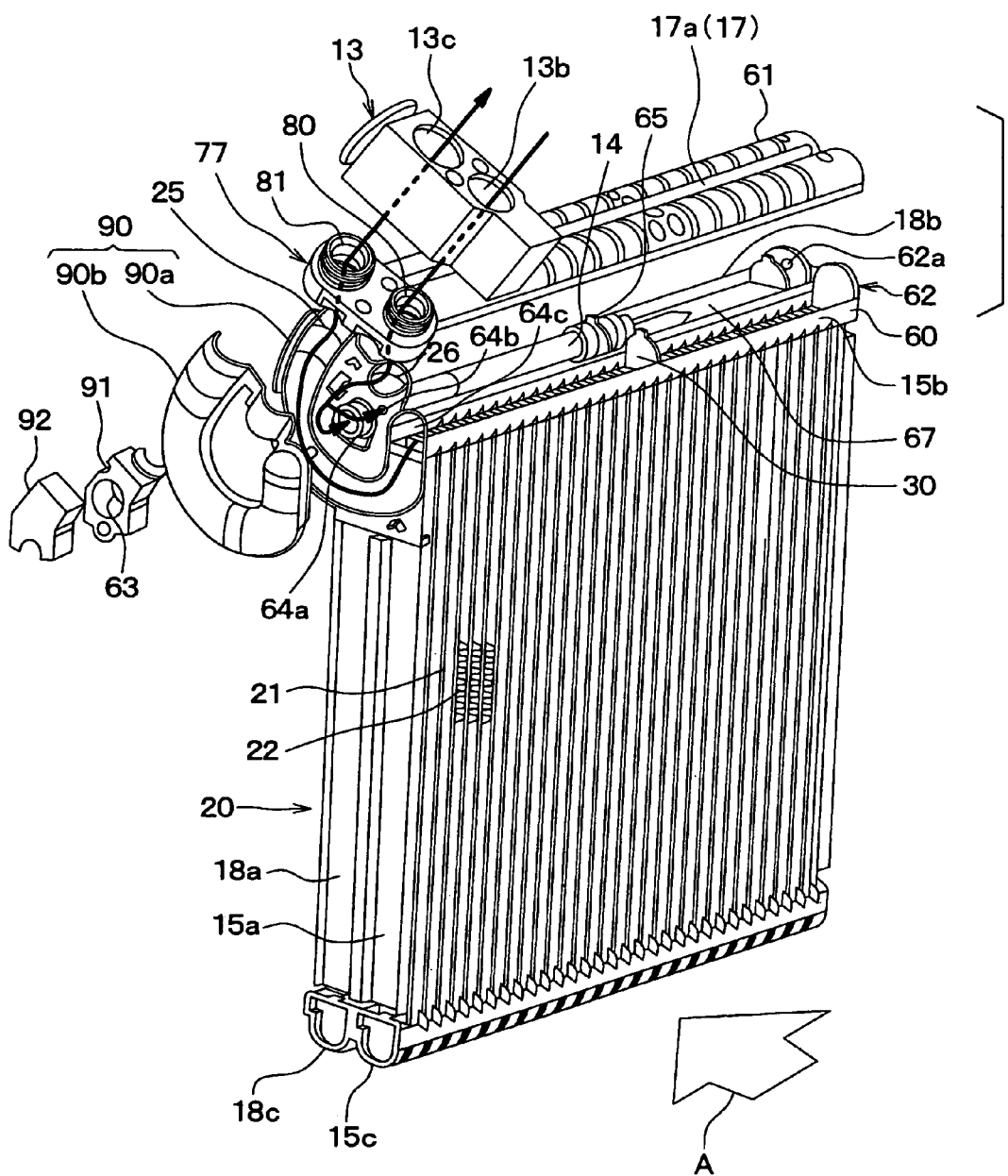
FIG. 15 is an exploded perspective view showing the schematic structure of an integrated unit according to a fifth embodiment of the invention.

In each of the above-described embodiments the direction of mounting of the thermal expansion valve 13 is in parallel to the longitudinal direction of the ejector 14. However, in a fifth embodiment, the direction of mounting of the thermal expansion valve 13 is substantially orthogonal to the longitudinal direction of the ejector 14 as shown in FIG. 15. In this way, in this embodiment, various modifications are made to the connection structure of the thermal expansion valve 13 of the above-described first embodiment.

An interposing member 90 is fixed to the sides of the upper tanks 15b and 18b by brazing to form the refrigerant inlet 25, the refrigerant outlet 26, the main passage side opening 64a, the branch passage side opening 64b, and the refrigerant outlet side opening 64c. In the fifth embodiment, the interposing member 90 is divided into a tank side half-divided member 90a and an opposite-tank side half-divided member 90b, and made of aluminum material.

The fixing member 77 is fixed to the interposing member 90 substantially from the upper side. The thermal expansion valve 13 is also fixed to the fixing member 77 substantially from the upper side. Thus, the direction of mounting of the thermal expansion valve 13 is in parallel to the longitudinal direction of the ejector 14. Although not shown, a mounting surface of the thermal expansion valve 13 to the fixing member 77 is formed in parallel to the direction of insertion of the ejector 14.

A branch passage member 91 branches the refrigerant inlet 25 of the interposing member 90 into the main passage 25a and the branch passage 16, and constructs the ejector-insertion hole 63. In this embodiment, the branch passage member 91 is made of aluminum member, and fixed to the interposing member 90 by brazing.

A closing member 92 closes the ejector-insertion hole 63 after the ejector 14 is inserted from the ejector-insertion hole 63 into the upper tank 18b.

Since in each of the above-described embodiments, the mounting direction of the thermal expansion valve 13 is in parallel to the longitudinal direction of the ejector 14, the ejector 14 may be opposed to the direction of transmission of the vibration of the expansion valve 13, thereby the vibration of the expansion valve 13 tends to be transmitted to the ejector 14.

In this embodiment, the mounting direction of the thermal expansion valve 13 is substantially orthogonal to the longitudinal direction of the ejector 14, thereby avoiding the ejector 14 from being opposed to the direction of transmission of the vibration of the expansion valve 13. Accordingly, it can suppress the vibration of the thermal expansion valve 13 from being transmitted to the ejector 14.

Since the mounting direction of the thermal expansion valve 13 is substantially orthogonal to the longitudinal direction of the ejector 14, the expansion valve 13 can be spaced apart from the end on the inlet side of the ejector 14 without increasing the size of the body of the integrated unit 20 in the longitudinal direction of the ejector 14. This can suppress the vibration of the expansion valve 13 from being transmitted to the ejector 14, while avoiding an increase in size of the body of the integrated unit 20.

Figure 16:
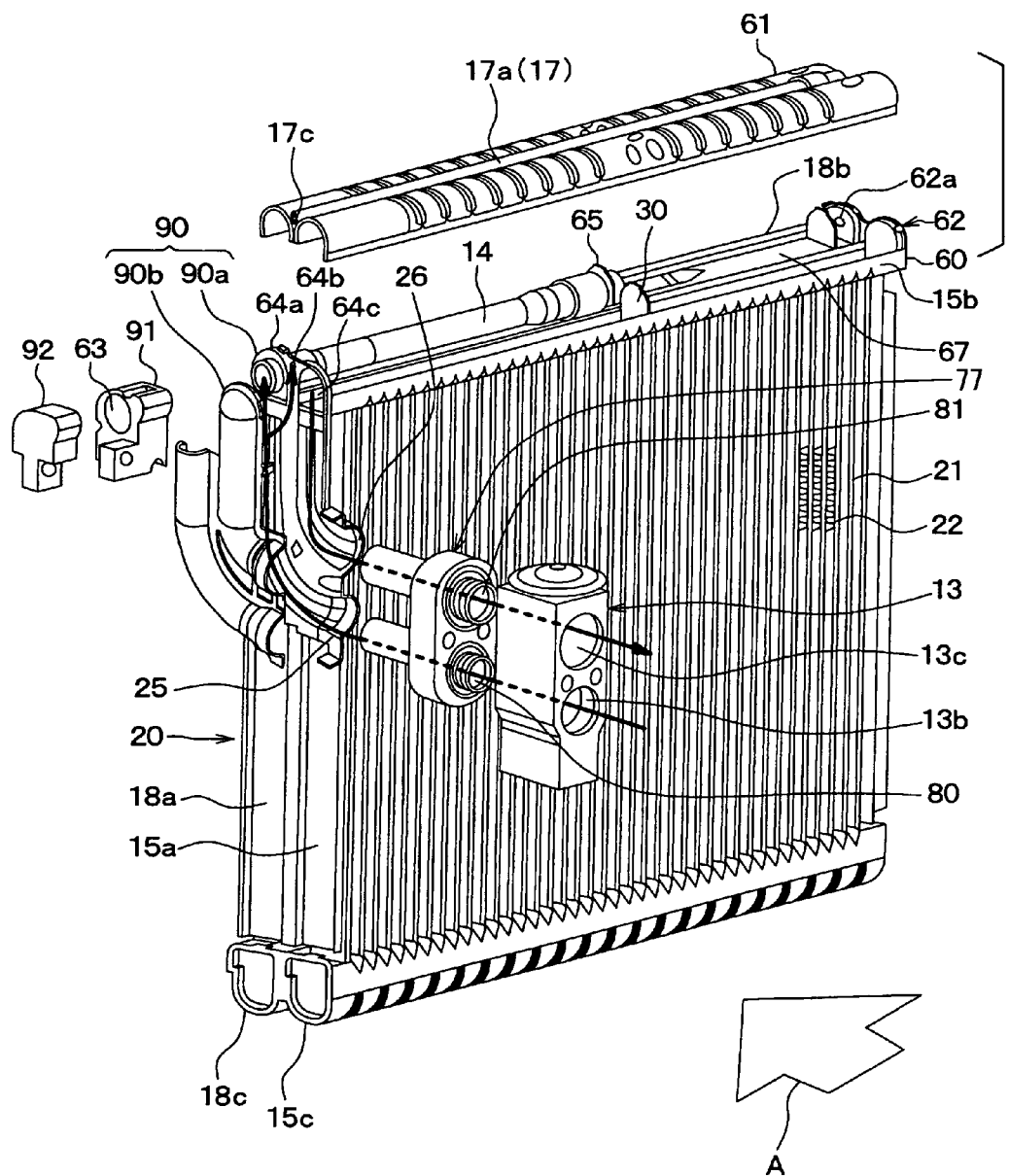
FIG. 16 is an exploded perspective view showing the schematic structure of an integrated unit according to a modified example of the fifth embodiment.

FIG. 16 is a modified example of this embodiment, in which the fixing member 77 is fixed to the interposing member 90 from the upstream side of the air flow, and the thermal expansion valve 13 is also fixed to the connection block 23 from the upstream side of the air flow.

Sixth Embodiment

Figure 17:
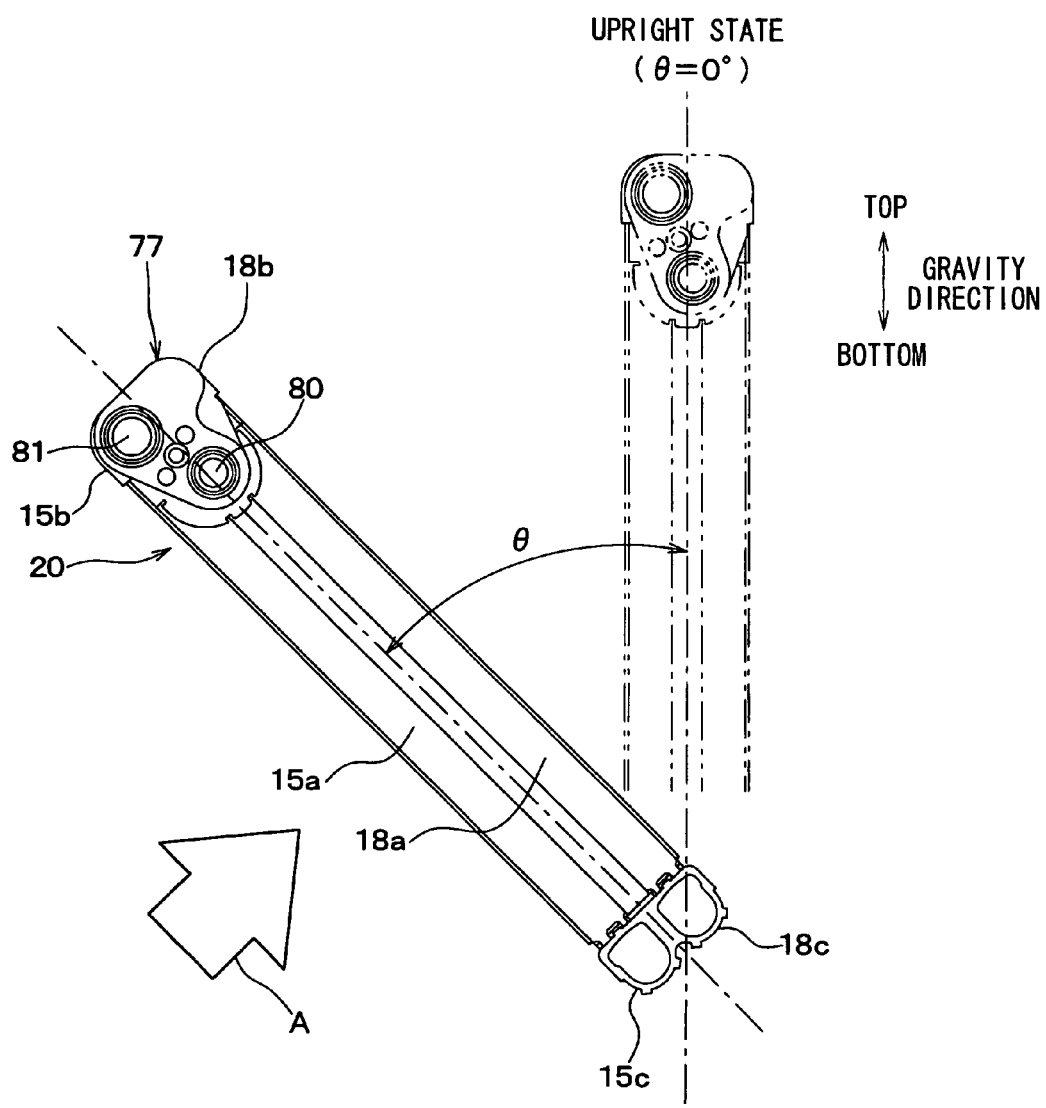
FIG. 17 is a side view showing an actual set state of an integrated unit according to a sixth embodiment of the embodiment.

In a sixth embodiment, set states of the integrated unit 20 in the above-described respective embodiments will be described. In FIG. 17, the solid line shows an example of an actual set state of the integrated unit 20.

In FIG. 17, the alternate long and two short dashes line shows the state in which the integrated unit 20 is set (hereinafter referred to as an "upright set state") such that a core surface of the heat-exchange core portion 18a of the second evaporator 18 is in parallel to the direction of gravity, and the upper tank 18b is positioned in the upper position in the direction of gravity with respect to the heat-exchange core portion 18a.

An angle θ is an angle formed by the core surface of the heat-exchange core portion 18a in the actual set state (indicated by the solid line in FIG. 17) and the core surface of the heat-exchange core portion 18a in the upright set state (indicated by the alternate long and two short dashes line in FIG. 17). The positive direction of the inclination angle θ is a direction inclined toward the upstream side of the air flow A (in the counterclockwise direction shown in FIG. 17).

The detailed studies by the inventors have shown that setting the integrated unit 20 at the inclination angle θ of not less than 45° nor more than 315° (45°≦θ≦315°) can suppress the vibration of the ejector 14.

The reason for this will be described below based on FIGS. 18A to 18C. A gap between the ejector 14 and the inner wall surface of the upper tank 18b is preferably set as small as possible so as to downsize the body of the upper tank 18b of the second evaporator 18.

Thus, in the entire inner wall surface of the upper tank 18b, the gaps between the ejector 14 and the inner wall surface on the opposite side to the tube 21 (the upper side surface shown in FIG. 18A), and between the ejector 14 and the inner wall surface extending substantially in parallel to the tube 21 (the surface extending substantially vertically shown in FIG. 18A) become relatively small.

However, the gap between the ejector 14 and the inner wall surface on the tube 21 side of the upper tank 18*b* (the lower side surface shown in FIG. 18A) may be relatively large for inserting the upper end of the tube 21 thereinto.

On the other hand, since the refrigerant in the upper tank 18*b* is in the gas-liquid two-phase state, the liquid-phase refrigerant is stored in the lower portion of the upper tank 18*b*. The liquid-phase refrigerant has the large density as compared to the gas-phase refrigerant. When the ejector 14 is immersed into the liquid-phase refrigerant, the vibration of the ejector 14 can be suppressed.

Figure 18A:
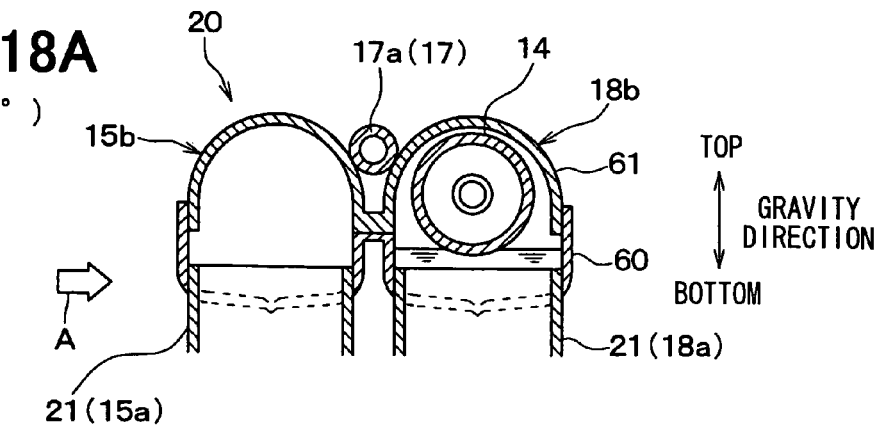

In this regard, when the inclination angle $\theta=0°$ as shown in FIG. 18A, the liquid-phase refrigerant is stored in the inner wall surface of the upper tank 18*b* on the tube 21 side. The relative large gap between the inner wall surface on the tube 21 side and the ejector 14 makes it difficult for the ejector 14 to be immersed into the liquid-phase refrigerant.

Figure 18B:
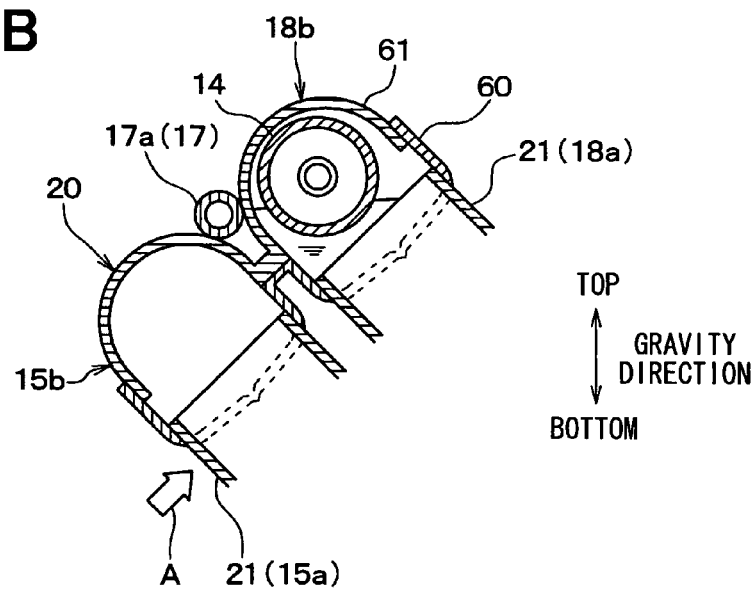
Figure 18C:
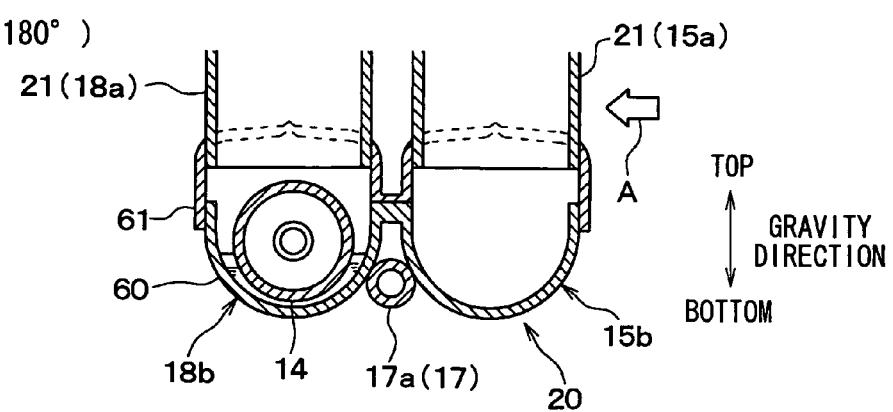

On the other hand, when the inclination angle $\theta=45°$ as shown in FIG. 18B or when the inclination angle $\theta=180°$ as shown in FIG. 18C, the liquid-phase refrigerant is stored on the side of the inner wall surface of the upper tank 18*b* extending substantially in parallel to the tube 21, or on the side of the inner wall surface opposed to the tube 21. Since a gap between the ejector 14 and the inner wall surface extending substantially in parallel to the tube 21, or a gap between the ejector 14 and the inner wall surface opposite to the tube 21 is relatively small, the ejector 14 is easily immersed into the liquid-phase refrigerant.

Thus, setting the integrated unit 20 so as to set the inclination angle $\theta$ to not less than 45° nor more than 315° makes it easy for the ejector 14 to be immersed into the liquid-phase refrigerant, thereby enabling suppression of the vibration of the ejector 14, thus reducing the radiated sound generated from the integrated unit 20.

The ejector 14 is vibrated not only due to the transmission of vibration from the thermal expansion valve 13, but also vibrates itself when decompressing the refrigerant. According to this embodiment, the vibration generated by the ejector 14 itself can be suppressed.

Figures 19, 20:
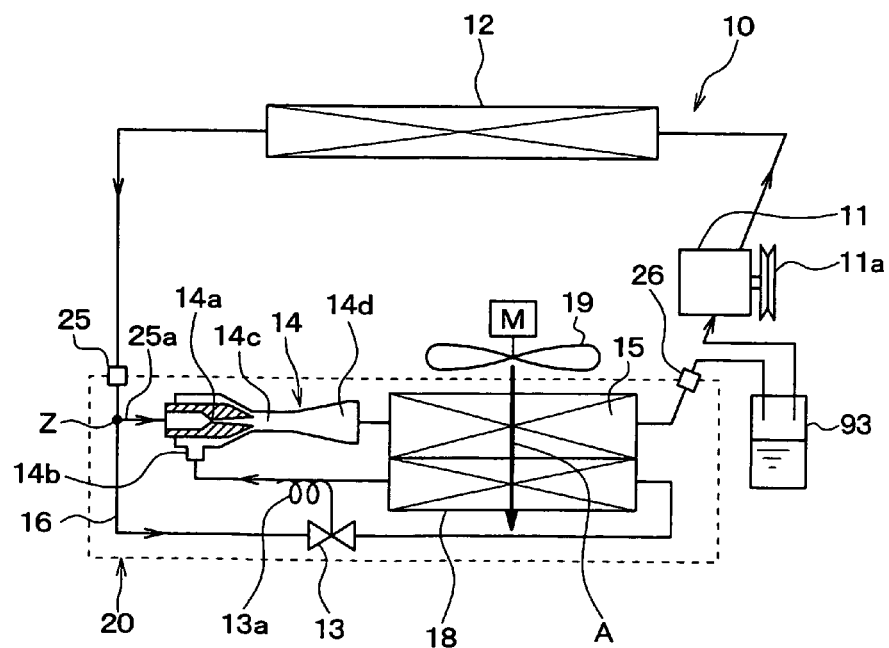
FIG. 19 is a table showing the result of measurement of the radiated sound according to the inclination angle of the sixth embodiment.
FIG. 20 is a schematic diagram of a refrigerant cycle device for a vehicle according to a seventh embodiment of the present invention.

FIG. 19 is a table showing an example of the measurement results of the radiated sound in this embodiment. The measurement results are obtained when the sixth embodiment is applied to the integrated unit 20 of the first embodiment, to the integrated unit 20 of the modification (modified example) of the first embodiment, and the comparative example shown in FIG. 21. In FIG. 19, the "noise reduce" means an amount of reduction in radiated sound at an inclination angle $\theta$ with respect to the radiated sound at the inclination angle $\theta=0°$. The measurement conditions of the radiated sound in FIG. 19 are the same as those in the first embodiment.

As can be seen from FIG. 19, when the inclination angle $\theta$ is 45° or 180°, the radiated sound can be reduced well as compared to the case at the inclination angle $\theta$ of 0°. For the inclination angle $\theta$ of not less than 45° nor more than 315°, the radiated sound can be reduced well as compared to the case at the inclination angle $\theta$ of 0°, like the case of the inclination angle $\theta$ of 45° or 180°.

Seventh Embodiment

In the above-described first embodiment, the refrigerant cycle device is configured which includes the liquid receiver 12*a* disposed on the outlet side of the radiator 12, and the expansion valve 13 disposed on the outlet side of the liquid receiver 12*a*. In a seventh embodiment, as shown in FIG. 20, the liquid receiver 12*a* can be omitted, and an accumulator 93 is provided on the outlet side of the first evaporator 15 to serve as a gas-liquid separator for separating the refrigerant into gas and liquid phases and for storing therein the excessive liquid refrigerant. The gas-phase refrigerant is guided from the accumulator 93 to the suction side of the compressor 11.

The thermal expansion valve 13 is disposed in the refrigerant branch passage 16 on the inlet side of the second evaporator 18. The temperature sensing portion 13*a* is disposed on the outlet side of the second evaporator 18. That is, the thermal expansion valve 13 of this embodiment is adapted to detect the superheat degree of the refrigerant on the outlet side of the second evaporator 18 based on the temperature and pressure of the refrigerant on the outlet side of the evaporator 18. The expansion valve 13 is also adapted to adjust the degree of opening of the valve (refrigerant flow amount) such that the superheat degree of the refrigerant on the outlet side of the second evaporator 18 becomes a preset predetermined value.

Like the first embodiment, the thermal expansion valve 13 is fixed to the fixing member 77 in the integrated unit 20. In the seventh embodiment, the other parts of the refrigerant cycle device 10 may be similar to those of the first embodiment shown in FIG. 1. This arrangement can also exhibit the same effect as that of the first embodiment.

Other Embodiments

The invention is not limited to the embodiments disclosed above, and various modifications can be made to the embodiments described above as follows.

(1) In the above-described first and second embodiments, the fixing member 77 is integrally formed with the plug 78 and the spacer 79. However, at least two of the fixing member 77, the plug 78, and the spacer 79 may be formed separately from each other. In this case, at least one of the fixing member 77, the plug 78, and the spacer 79 is made of resin material, which can provide the same effects as those of the first and second embodiments.

(2) Although in each of the above-described embodiments, the ejector 14 is inserted into the evaporator tank 18*b* through the ejector-insertion hole 63 provided in the connection block 23, the insertion hole of the ejector may be provided in a cap for closing the side of the evaporator tank 18*b* in the longitudinal direction. As this cap, the cap 62 for closing the right sides of the upper tanks 15*b* and 18*b* is exemplified as shown in FIGS. 2 and 4.

(3) In each of the above-described embodiments, the ejector 14 is disposed in the upper tank 18*b* of the second evaporator 18. The ejector 14 may be disposed in the upper tank 18*b* of the second evaporator 18 or in the tank 15*b* or 15*c* of the first evaporator 15.

(4) In the first embodiment, during the integrally assembling of the components of the integrated unit 20, members other than the ejector 14, that is, the first evaporator 15, the second evaporator 18, the connection block 23, the capillary tube 17*a*, and the like are integrally brazed to each other. These members can be integrally assembled by various fixing means, such as a screw, caulking, welding, or an adhesive, other than brazing.

(5) In the above-described embodiments has described the vapor-compression subcritical cycle using refrigerant whose high-pressure side pressure does not exceed the critical pressure, such as a flon-based or HC-based refrigerant. However, the invention may be applied to a vapor-compression supercritical cycle using refrigerant whose high-pressure side pressure exceeds the critical pressure, such as carbon dioxide ($CO_2$).

In the supercritical cycle, the refrigerant discharged from the compressor only radiates heat in the supercritical state at the radiator 12 without being condensed, and thus the liquid receiver 12a disposed on the high-pressure side cannot exhibit the gas and liquid separating effect of the refrigerant and the retaining effect of the excessive liquid refrigerant. Thus, the supercritical cycle may employ a structure in which the accumulator 93 serving as the low-pressure side gas-liquid separator is disposed on the outlet side of the first evaporator 15, as shown in FIG. 20.

(6) Although in the above-described embodiments, the throttle mechanism 17 is constructed of the capillary tube 17a, the throttle mechanism 17 may be constructed of a fixed throttle hole, such as an orifice. The throttle mechanism 17 may be an electric control valve whose opening degree of the valve (opening degree of a throttle passage) is adjustable by an electric actuator. The throttle mechanism 17 may be constructed of a combination of an electromagnetic valve and the fixed throttle, such as the capillary tube 17a or the fixed throttle hole.

(7) In each of the above-described embodiments, the fixed ejector including the nozzle portion 14a with a constant passage sectional area is exemplified as the ejector 14. However, the ejector 14 may be a variable ejector including a variable nozzle portion whose passage area is adjustable.

Specifically, the variable nozzle portion may be a mechanism, for example, in which a needle is inserted into a passage of a variable nozzle and the position of the needle is controlled by the electric actuator to adjust the passage area.

(8) In the first embodiment, the invention is applied to the refrigerant cycle device 10 used for cooling the interior of the vehicle and the inside of the freezer and refrigerator. Both the first evaporator 15 having the refrigeration evaporation temperature on the high-temperature side and the second evaporator 18 having the refrigerant evaporation temperature on the low-temperature side may be used to cool different areas in the interior of the vehicle (for example, a front seat side area in the vehicle compartment and a rear seat side area in the vehicle compartment).

Both the first evaporator 15 having the refrigeration evaporation temperature on the high-temperature side and the second evaporator 18 having the refrigerant evaporation temperature on the low-temperature side may be used to cool the inside of the freezer and refrigerator. That is, a refrigerator chamber in the freezer and refrigerator may be cooled by the first evaporator 15 having the refrigeration evaporation temperature on the high-temperature side. A freezer chamber in the freezer and refrigerator may be cooled by the second evaporator 18 having the refrigerant evaporation temperature on the low-temperature side.

(9) Each of the above-described embodiments has described the refrigerant cycle device for a vehicle, it is apparent that the invention is not limited to the refrigerant cycle device for a vehicle, and can also be applied to a fixed refrigerant cycle device or the like in the same way.

(10) In the above-described embodiments, the features of at least two embodiments may be suitably combined. In the above-described embodiments, the ejector 14 is integrated to both the first evaporator 15 and the second evaporator 18, so as to form the integrated unit 20. However, in the integrated unit 20, the ejector 14 can be integrated with at least one of the evaporators 15, 18. That is, the present invention can be applied to an integrated unit in which the ejector 14 and at least one evaporator (15, 18) are integrally assembled.

Such changes and modifications are to be understood as being within the scope of the present invention as defined by the appended claims.

What is claimed is:

1. An integrated unit for a refrigerant cycle device, comprising:
    an ejector having a nozzle portion for decompressing refrigerant, and a refrigerant suction port from which refrigerant is drawn by a refrigerant flow injected from the nozzle portion, the ejector being configured for mixing the refrigerant injected from the nozzle portion and the refrigerant drawn from the refrigerant suction port and for discharging the mixed refrigerant therefrom;
    an evaporator for evaporating the refrigerant to be drawn into the refrigerant suction port or the refrigerant discharged from the ejector, the evaporator and the ejector being integrally assembled, wherein the evaporator includes a plurality of tubes for allowing the refrigerant to flow therethrough, and a tank extending in a longitudinal direction that is substantially parallel to a direction of arrangement of the tubes, the tank being configured to distribute the refrigerant into the tubes or collect the refrigerant flowing from the tubes;
    a plug for sealing an insertion hole that is provided in a longitudinal end surface of the tank such that the ejector is inserted from the insertion hole to be located in the tank;
    a spacer configured to have a gap between the plug and the ejector; and
    a fixing member, disposed between the longitudinal end surface of the tank and an expansion valve for decompressing the refrigerant, for fixing the expansion valve to the longitudinal end surface of the tank,
    wherein at least one of the fixing member, the plug, and the spacer is formed of a resin material.

2. The integrated unit for the refrigerant cycle device according to claim 1, wherein the resin material is polybutylene terephthalate.

3. The integrated unit for the refrigerant cycle device according to claim 1, wherein a total weight of the fixing member, the plug, and the spacer is set to 20 g or more.

4. The integrated unit for the refrigerant cycle device according to claim 1, wherein the plug, the spacer, and the fixing member are integrally formed.

5. The integrated unit for the refrigerant cycle device according to claim 1, wherein the fixing member is configured such that a direction of fixing the expansion valve to the fixing member is approximately perpendicular to a direction of insertion of the ejector into the tank.

6. The integrated unit for the refrigerant cycle device according to claim 5, wherein a mounting surface of the expansion valve to the fixing member is configured to be in parallel to the direction of insertion of the ejector.

7. The integrated unit for the refrigerant cycle device according to claim 1, further comprising
    an ejector fixing mechanism, disposed in the tank, for fixing the ejector to the tank; and
    a buffer member disposed at least one of between the ejector fixing mechanism and the ejector, and between the spacer and the ejector.

8. The integrated unit for the refrigerant cycle device according to claim 7, wherein the buffer member is made of a resin material or a rubber material.

9. The integrated unit for the refrigerant cycle device according to claim 1, wherein the expansion valve for decompressing the refrigerant is fixed to the longitudinal end surface of the tank, wherein the ejector is disposed in the tank such that an outlet side of the ejector for discharging the refrigerant therefrom is directed in the insertion direction, and such that an inlet side of the nozzle portion is directed opposite to the insertion direction, wherein the ejector is adapted to be pushed in the insertion direction by a different in pressure between the outlet side and the inlet side of the ejector, and wherein the plug and the ejector are located to have a space overall therebetween.

10. The integrated unit for the refrigerant cycle device according to claim 1, wherein the evaporator includes a heat-exchanging core portion having the tubes, in which the refrigerant flowing in the tubes is heat exchanged with air passing through the heat-exchanging core portion outside the tubes, and wherein a core surface of the heat-exchange core portion is inclined by 45° or more with respect to an upright set state in which the core surface of the heat-exchange core portion of the evaporator is in parallel to the direction of gravity, and the tank is positioned in an upper position in the direction of gravity with respect to the heat-exchange core portion.

11. An integrated unit for a refrigerant cycle device, comprising:

an ejector having a nozzle portion for decompressing refrigerant, and a refrigerant suction port from which refrigerant is drawn by a refrigerant flow injected from the nozzle portion, the ejector being configured for mixing the refrigerant injected from the nozzle portion and the refrigerant drawn from the refrigerant suction port and for discharging the mixed refrigerant therefrom;

an evaporator for evaporating the refrigerant to be drawn into the refrigerant suction port or the refrigerant discharged from the ejector, the evaporator and the ejector being integrally assembled, wherein the evaporator includes a plurality of tubes for allowing the refrigerant to flow therethrough, and a tank extending in a longitudinal direction that is substantially parallel to a direction of arrangement of the tubes, the tank being configured to distribute the refrigerant into the tubes or collect the refrigerant flowing from the tubes;

a plug for sealing an insertion hole that is provided in a longitudinal end surface of the tank such that the ejector is inserted from the insertion hole to be located in the tank;

a spacer configured to have a gap between the plug and the ejector; and a fixing member disposed between the longitudinal end surface of the tank and an expansion valve for decompressing the refrigerant, for fixing the expansion valve to the longitudinal end surface of the tank, wherein a total weight of the fixing member, the plug, and the spacer is set to 20 g or more.

12. The integrated unit for the refrigerant cycle device according to claim 11, wherein the plug, the spacer, and the fixing member are integrally formed.

13. An integrated unit for a refrigerant cycle device, comprising:

an ejector having a nozzle portion for decompressing refrigerant, and a refrigerant suction port from which refrigerant is drawn by a refrigerant flow injected from the nozzle portion, the ejector being configured for mixing the refrigerant injected from the nozzle portion and the refrigerant drawn from the refrigerant suction port and for discharging the mixed refrigerant therefrom;

an evaporator for evaporating the refrigerant to be drawn into the refrigerant suction port or the refrigerant discharged from the ejector, the evaporator and the ejector being integrally assembled, wherein the evaporator includes a plurality of tubes for allowing the refrigerant to flow therethrough, and a tank extending in a longitudinal direction that is substantially parallel to a direction of arrangement of the tubes, the tank being configured to distribute the refrigerant into the tubes or collect the refrigerant flowing from the tubes;

an insertion hole that is provided in a longitudinal end surface of the tank such that the ejector is inserted from the insertion hole to be located in the tank; and a fixing member disposed between the longitudinal end surface and an expansion valve for decompressing the refrigerant, for fixing the expansion valve to the longitudinal end surface of the tank, wherein the fixing member is configured such that a direction of fixing the expansion valve to the fixing member is approximately perpendicular to a direction of insertion of the ejector into the tank.

14. The integrated unit for the refrigerant cycle device according to claim 13, wherein a mounting surface of the expansion valve to the fixing member is configured to be in parallel to the direction of insertion of the ejector.

15. An integrated unit for a refrigerant cycle device, comprising:

an ejector having a nozzle portion for decompressing refrigerant, and a refrigerant suction port from which refrigerant is drawn by a refrigerant flow injected from the nozzle portion, the ejector being configured for mixing the refrigerant injected from the nozzle portion and the refrigerant drawn from the refrigerant suction port and for discharging the mixed refrigerant therefrom;

an evaporator for evaporating the refrigerant to be drawn into the refrigerant suction port or the refrigerant discharged from the ejector, the evaporator and the ejector being integrally assembled, wherein the evaporator includes a plurality of tubes for allowing the refrigerant to flow therethrough, and a tank extending in a longitudinal direction that is substantially parallel to a direction of arrangement of the tubes, the tank being configured to distribute the refrigerant into the tubes or collect the refrigerant flowing from the tubes;

an expansion valve for decompressing refrigerant, the expansion valve being fixed to a longitudinal end surface of the tank of the evaporator;

a plug for sealing an insertion hole that is provided in the longitudinal end surface of the tank such that the ejector is inserted from the insertion hole to be located in the tank;

a spacer configured to have a gap between the plug and the ejector;

an ejector fixing mechanism, disposed in the tank, for fixing the ejector to the tank; and a buffer member disposed at least one of between the ejector fixing mechanism and the ejector, and between the spacer and the ejector.

16. The integrated unit for the refrigerant cycle device according to claim 15, wherein the buffer member is made of a resin material or a rubber material.

17. An integrated unit for a refrigerant cycle device, comprising:

an ejector having a nozzle portion for decompressing refrigerant from an outlet side of an expansion valve, and a refrigerant suction port from which refrigerant is drawn by a refrigerant flow injected from the nozzle portion, the ejector being configured for mixing the refrigerant injected from the nozzle portion and the refrigerant drawn from the refrigerant suction port and for discharging the mixed refrigerant therefrom;

an evaporator for evaporating the refrigerant to be drawn into the refrigerant suction port or the refrigerant discharged from the ejector, the evaporator and the ejector being integrally assembled, wherein the evaporator includes a plurality of tubes for allowing the refrigerant to flow therethrough, and a tank extending in a longitudinal direction that is substantially parallel to a direction of arrangement of the tubes, the tank being configured to distribute the refrigerant into the tubes or collect the refrigerant flowing from the tubes; and a plug for sealing an insertion hole that is provided in a longitudinal end surface of the tank such that the ejector is inserted from the insertion hole to be located in the tank, wherein the expansion valve for decompressing the refrigerant is fixed to the longitudinal end surface of the tank, wherein the ejector is disposed in the tank such that an outlet side of the ejector, for discharging the refrigerant therefrom, is directed in the insertion direction, and such that an inlet side of the nozzle portion is directed opposite to the insertion direction, wherein the ejector is adapted to be pushed in the insertion direction by a different in pressure between the outlet side and the inlet side of the ejector, and wherein the plug and the ejector are located to have a space overall therebetween.

18. The integrated unit for the refrigerant cycle device according to claim 17, wherein the evaporator includes a heat-exchanging core portion having the tubes, in which the refrigerant flowing in the tubes is heat exchanged with air passing through the heat-exchanging core portion outside the tubes, and wherein a core surface of the heat-exchange core portion is inclined by 45° or more with respect to an upright set state in which the core surface of the heat-exchange core portion of the evaporator is in parallel to the direction of gravity, and the tank is positioned in an upper position in the direction of gravity with respect to the heat-exchange core portion.

19. An integrated unit for a refrigerant cycle device, comprising:

an ejector having a nozzle portion for decompressing refrigerant, and a refrigerant suction port from which refrigerant is drawn by a refrigerant flow injected from the nozzle portion, the ejector being configured for mixing the refrigerant injected from the nozzle portion and the refrigerant drawn from the refrigerant suction port and for discharging the mixed refrigerant therefrom; and an evaporator for evaporating the refrigerant to be drawn into the refrigerant suction port or the refrigerant discharged from the ejector, the evaporator and the ejector being integrally assembled, wherein the evaporator includes a plurality of tubes for allowing the refrigerant to flow therethrough, and a tank extending in a longitudinal direction that is substantially parallel to a direction of arrangement of the tubes, the tank being configured to distribute the refrigerant into the tubes or collect the refrigerant flowing from the tubes, wherein a longitudinal end surface of the tank is provided with an insertion hole such that the ejector is inserted from the insertion hole to be located in the tank, wherein the evaporator includes a heat-exchanging core portion having the tubes, in which the refrigerant flowing in the tubes is heat exchanged with air passing through the heat-exchanging core portion outside the tubes, and wherein a core surface of the heat-exchange core portion is inclined by 45° or more with respect to an upright set state in which the core surface of the heat-exchange core portion of the evaporator is in parallel to the direction of gravity, and the tank is positioned in an upper position in the direction of gravity with respect to the heat-exchange core portion.

* * * * *